(12) United States Patent
Heyral et al.

(10) Patent No.: US 11,268,657 B2
(45) Date of Patent: Mar. 8, 2022

(54) DEVICE FOR FILLING AND WITHDRAWING GAS

(71) Applicant: ALCRYS FLUID-CONTROL & SERVICES, Gardanne (FR)

(72) Inventors: Olivier Heyral, Meyreuil (FR); Zsolt Zsigmond, Margency (FR)

(73) Assignee: ALCRYS FLUID-CONTROL & SERVICES, Gardanne (FR)

( * ) Notice: Subject to any disclaimer, the term of this patent is extended or adjusted under 35 U.S.C. 154(b) by 0 days.

(21) Appl. No.: 17/232,423

(22) Filed: Apr. 16, 2021

(65) Prior Publication Data
US 2021/0231266 A1    Jul. 29, 2021

Related U.S. Application Data

(63) Continuation of application No. PCT/FR2018/052601, filed on Oct. 18, 2018.

(51) Int. Cl.
F17C 13/04         (2006.01)

(52) U.S. Cl.
CPC ...... F17C 13/04 (2013.01); *F17C 2205/0332* (2013.01); *F17C 2205/0335* (2013.01);
(Continued)

(58) Field of Classification Search
CPC .............. F17C 13/04; F17C 2205/0332; F17C 2205/0335; F17C 2205/0338;
(Continued)

(56) References Cited

U.S. PATENT DOCUMENTS 5,063,976 A * 11/1991 Oi ............................. F17C 5/06
                                                        141/18
5,309,945 A *  5/1994 Sakai ...................... F16K 1/305
                                                        137/861
(Continued)

FOREIGN PATENT DOCUMENTS

EP          2705296         3/2014
FR          2927979         8/2009
(Continued)

OTHER PUBLICATIONS

International Search Report for International Application PCT/FR2018/052601, dated Jul. 3, 2019.

*Primary Examiner* — Timothy P. Kelly
*Assistant Examiner* — Stephanie A Shrieves
(74) *Attorney, Agent, or Firm* — Burris Law, PLLC

(57) ABSTRACT

A device for filling and withdrawing gas includes a withdrawing circuit provided with a storage connector that can be connected to a storage container and a withdrawing connector that can be connected to a withdrawing device. The device also includes a filling circuit provided with a filling connector that can be connected to a gas source for filling the container. The filling connector includes a piston internally defining a filling duct and having a drain orifice opening transversely into said filling duct. The piston is movable inside a drain body provided with a drain duct connected to a leakage circuit connected to the outside, between an open position wherein the drain orifice does not coincide with the drain duct and a closed position wherein the drain orifice coincides with the drain duct to establish communication between said filling duct and the leakage circuit.

11 Claims, 17 Drawing Sheets

(52) U.S. Cl.
CPC ............... *F17C 2205/0338* (2013.01); *F17C 2205/0385* (2013.01); *F17C 2205/0394* (2013.01); *F17C 2221/012* (2013.01); *F17C 2223/036* (2013.01); *F17C 2225/033* (2013.01)

(58) Field of Classification Search
CPC ...... F17C 2205/0385; F17C 2205/0394; F17C 2221/012; F17C 2223/036; F17C 2225/033; F17C 2205/0326; F17C 2223/0123; Y02E 60/32; F16K 1/307; F16K 5/103; F16K 24/02; F16K 31/50; G05D 1/0402; G05D 16/10
USPC .......................................................... 137/613
See application file for complete search history.

(56) References Cited

U.S. PATENT DOCUMENTS

| | | | | |
|---|---|---|---|---|
| 5,980,599 | A * | 11/1999 | Chris | B01D 53/00 55/312 |
| 5,996,625 | A * | 12/1999 | Collado | G05D 16/101 137/614.19 |
| 8,578,977 | B2 * | 11/2013 | Moretti | F17C 13/04 141/197 |
| 2001/0029979 | A1 * | 10/2001 | Zheng | F17C 13/025 137/240 |
| 2015/0040985 | A1 * | 2/2015 | Roberge | F17C 13/04 137/1 |
| 2018/0239375 | A1 * | 8/2018 | Heiderman | F17C 1/00 |
| 2021/0231267 | A1 * | 7/2021 | Heyral | F17C 13/04 |

FOREIGN PATENT DOCUMENTS

| | | |
|---|---|---|
| FR | 2962521 | 1/2012 |
| WO | 2013014355 | 1/2013 |
| WO | 2013135983 | 9/2013 |

* cited by examiner

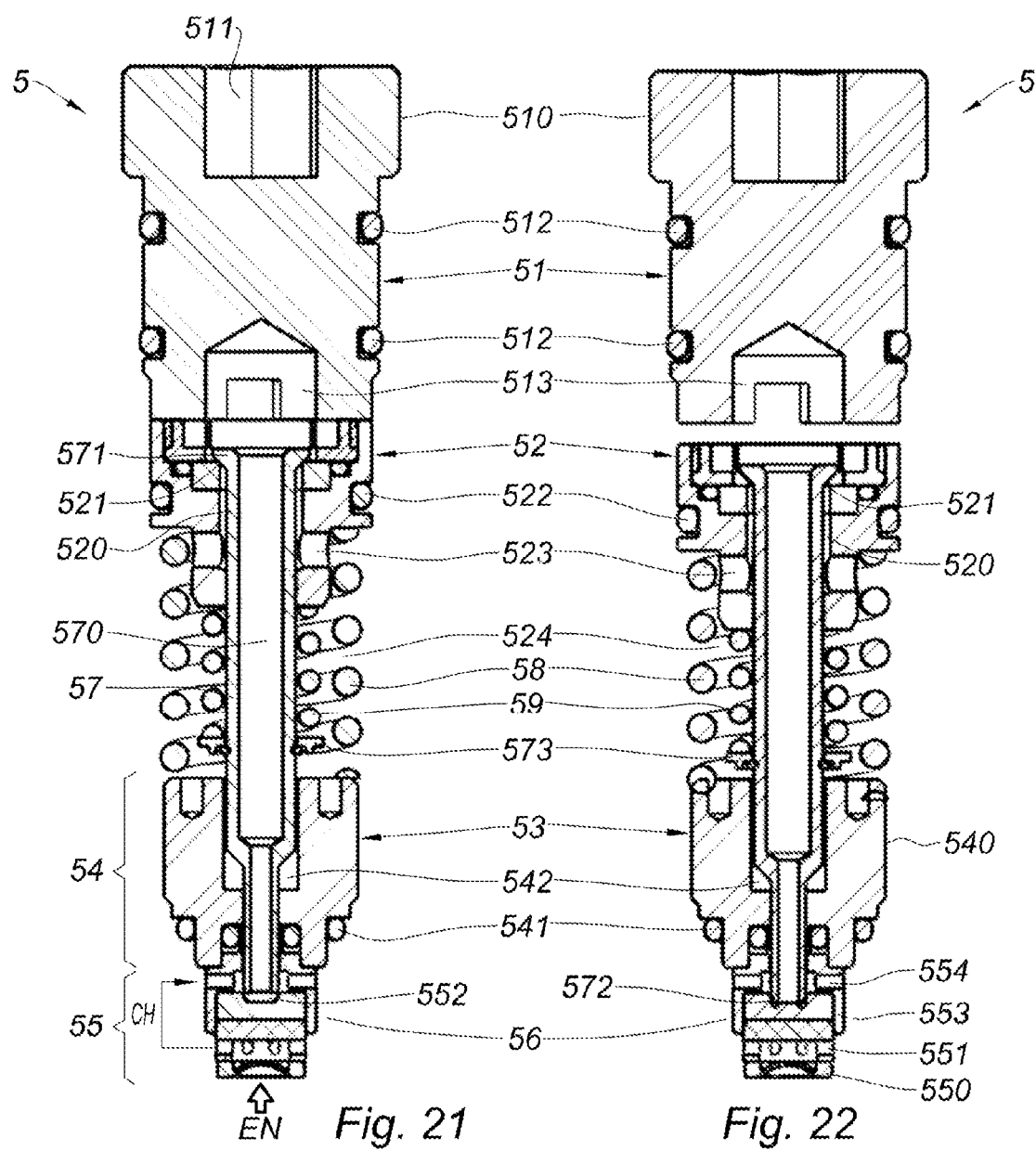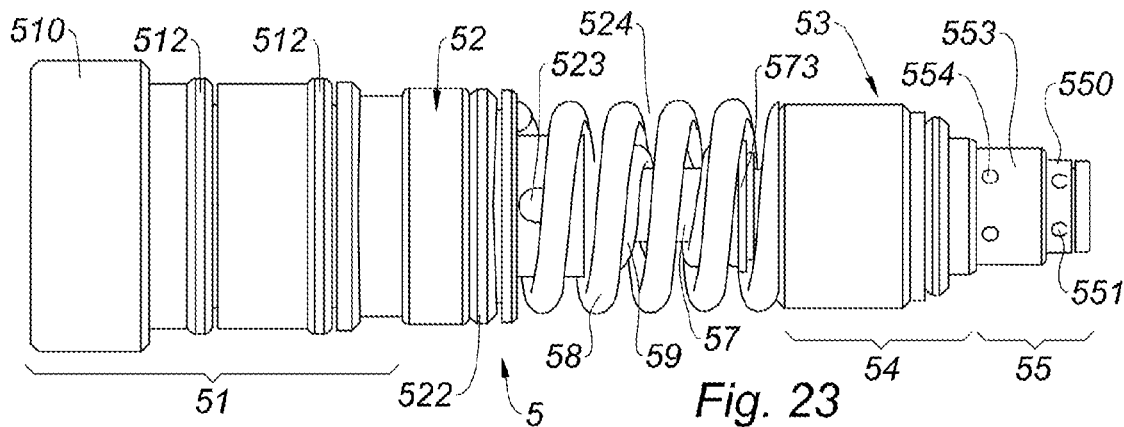

DEVICE FOR FILLING AND WITHDRAWING GAS

CROSS-REFERENCE TO RELATED APPLICATIONS

This application is a continuation of International Application No. PCT/FR2018/052601, filed on Oct. 18, 2018. The disclosure of the above application is incorporated herein by reference.

FIELD

The present disclosure relates to a device for filling and withdrawing gas.

BACKGROUND

The statements in this section merely provide background information related to the present disclosure and may not constitute prior art.

A device for filling and withdrawing gas generally includes a withdrawing circuit provided with a storage connector connected to a container for storing a pressurized gas and a withdrawing connector connected to a withdrawing device for withdrawing a reduced pressure gas, and a filling circuit provided with a filling connector configured for a connection with a source of pressurized gas for filling the storage container.

In particular, one application of this device is in the filling and withdrawing of gaseous hydrogen to supply a withdrawing device of a fuel cell type, in particular within a vehicle.

To withdraw gas under high pressure, conventionally between 350 and 700 bars for gaseous hydrogen storage tanks, in order to distribute it at low pressure, conventionally between 1 and 5 bars, a device or tap is used for filling and withdrawing gas which will have the function of allowing a connection with a pressure source in order to fill the storage container, and also to control the gas withdrawing operations, including isolation, safety and gas discharging operations.

The state of the art can be illustrated by the teaching of document WO2013/135983, which discloses a gas filling and withdrawing tap, in which a safety circuit connected to the withdrawing circuit and comprising a safety valve to evacuate the contents of the tank to the outside in the event of excessive temperature and/or pressure is provided.

It is also known from document WO2013/014355 to use a filling connector incorporating an isolation flap which is open during filling and which is closed during the disconnection with the source of pressurized gas.

At the end of the filling of the storage container, the filling connector must be uncoupled from the pressurized gas source, which requires a return to atmospheric pressure inside the filling connector, upstream of the integrated isolation flap. To do this, it is known to provide a drain system integrated into the source of pressurized gas and which has the function of providing depressurization upstream of the filling connector to allow uncoupling. However, in the event of inoperation of this drain system, handling issues may arise at the level of the filling connector.

SUMMARY

This section provides a general summary of the disclosure and is not a comprehensive disclosure of its full scope or all of its features.

The present disclosure provides device for filling and withdrawing gas which makes it possible to provide the depressurization desired for the uncoupling between the filling connector and the source of pressurized gas, even in the event of inoperation of the drain system integrated into the pressurized gas source.

The present disclosure also provides a filling and withdrawing device integrating functions allowing a safe regulation of the gas, including the filling, withdrawing, pressure reduction and other performance functions, in particular reducing leakage risk to the outside or downstream.

The present disclosure also provides a filling and withdrawing device both compact and of reduced weight.

To this end, the present disclosure provides a device for filling and withdrawing gas, which comprises a withdrawing circuit and a filling circuit. The withdrawing circuit includes an upstream end provided with a storage connector configured for a connection with a storage container for a pressurized gas, and a downstream end provided with a withdrawing connector configured for a connection with a withdrawing device for withdrawing a reduced pressure gas. The withdrawing circuit also includes at least one controlled isolation gate and at least one pressure regulator. The filling circuit includes an upstream end provided with a filling connector configured for a connection with a source of pressurized gas for filling the storage container, and a downstream end connected to the upstream end of the withdrawing circuit. The device is advantageous in that the filling connector comprises a piston internally defining a filling duct and having at least one drain orifice opening transversely into said filling duct. The piston is movable at least inside one drain body provided with a drain duct connected to a leakage circuit connected to the outside. The drain duct opens out at the periphery of the piston between two seals mounted around the piston. The piston being selectively displaceable between an open position establishing a communication between the filling duct and the upstream end of the filling circuit, and wherein the drain orifice does not coincide with the drain duct; and a closed position cutting off the communication between said filling duct and the upstream end of the filling circuit, and wherein the drain orifice coincides with the drain duct to establish a communication between said filling duct and the leakage circuit.

Thus, upon uncoupling between the filling connector and the pressurized gas source, the piston is displaced to the closed position, thereby placing the drain orifice in coincidence with the drain duct, helping to allow automatic depressurization via a drain channeled to the leakage circuit and therefore to the outside. The automatic drain during uncoupling is carried as the drain duct opens out at the periphery of the piston between two seals mounted around the piston, which provides a secure double sealing barrier.

According to a feature, the filling connector comprises an isolation flap movable relative to a seat between an upstream closed position of the filling duct and a downstream open position of the filling duct. The piston is selectively displaceable between its open position wherein said piston acts on said isolation flap towards its downstream position and its closed position wherein said piston does not act on said isolation flap which is biased towards its upstream position by means of a biasing member.

Thus, when the filling connector is uncoupled from the pressurized gas source, automatic depressurization takes place automatically upstream of the isolation flap, which closes before the drain orifice is placed in coincidence with the drain duct.

According to another feature, the piston is displaceable by screwing/unscrewing. In general, the piston is movable by any mechanical action ensuring a translational movement of the piston between its open position and its closed position, wherein the piston remains tightly connected to the filling connector. As a variant, the piston is movable with a quarter-turn mechanism or other equivalent mechanism.

In a particular variation, the storage connector comprises a main conduit connected to the upstream end of the withdrawing circuit and a leakage conduit connected to the leakage circuit and opening between two concentric seals.

Thus, in the event of a leakage at the level of the main conduit, if the leakage gas passes a first seal, it will naturally be oriented towards the leakage conduit, and therefore towards the leakage circuit, rather than passing through a second seal, thus providing improved performance at the level of the storage connector.

In a particular variation, the at least one pressure regulator comprises a high pressure chamber at the inlet, a low pressure chamber at the outlet, a movable regulation part on which the gas from the low pressure chamber bears on one side and a biasing member on the other side, a regulating flap cooperating with the regulation part and movable relative to an expansion seat between an upstream position for closing the communication between the low pressure chamber and the high pressure chamber and a downstream position for opening the communication between the low pressure chamber and high pressure chamber. When the gas pressure in the low pressure chamber exceeds a predefined threshold, the regulating flap is in the upstream position and the low pressure chamber is placed in communication with a discharge conduit connected to the leakage circuit.

Thus, the device offers additional performance with closing of the pressure regulator in the event of overpressure downstream of the pressure regulator (withdrawing device side), and evacuation of the pressurized gas to the leakage circuit, providing improved performance of the equipment.

Advantageously, the discharge conduit is framed by two seals mounted around the pressure regulator in the receiving bore of the pressure regulator.

According to a form of the present disclosure, the withdrawing circuit comprises two pressure regulators in series, wherein each pressure regulator has a discharge conduit connected to the leakage circuit and placed in communication with the corresponding low pressure chamber when the pressure of the gas in said lower pressure chamber exceeds a predefined threshold specific to each pressure regulator.

The use of two pressure regulators in series allows reliable regulation of the pressure between the high pressure storage container and the withdrawing device operating at low pressure.

According to another form of the present disclosure, the leakage circuit comprises a check valve, which allows a single point collection of the gases circulating in the leakage circuit and coming from the various components (connectors, pressure regulator(s), among others) of the device, and thus limit the communication holes to the outside.

Advantageously, the device further comprises a safety circuit having an upstream end connected to the upstream end of the withdrawing circuit and a downstream end connected to the outside. The safety circuit comprising at least one safety valve selected from a high pressure safety valve and/or a high temperature safety valve.

In accordance with another feature of the present disclosure, the safety circuit comprises a drain tap with a flow limiter, placed in parallel with the at least one safety valve.

Alternatively, the leakage circuit comprises a high pressure safety valve having an inlet connected to the upstream end of the withdrawing circuit.

The present disclosure also relates to a use of a filling and withdrawing device according to the present disclosure, wherein the storage connector is connected to a storage container for pressurized gaseous hydrogen and the withdrawing connector is connected to a withdrawing device of a fuel cell type.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 21 and 22 are schematic cross-sectional views of a first pressure regulator, or high pressure regulator, of the device of FIGS. 2 to 7, in a rest or regulation open configuration (FIG. 21) and in a closed discharging configuration in the event of overpressure in the low pressure chamber (FIG. 22);

FIG. 23 is a schematic side view of the first pressure regulator of FIGS. 21 and 22;

Figure 13:
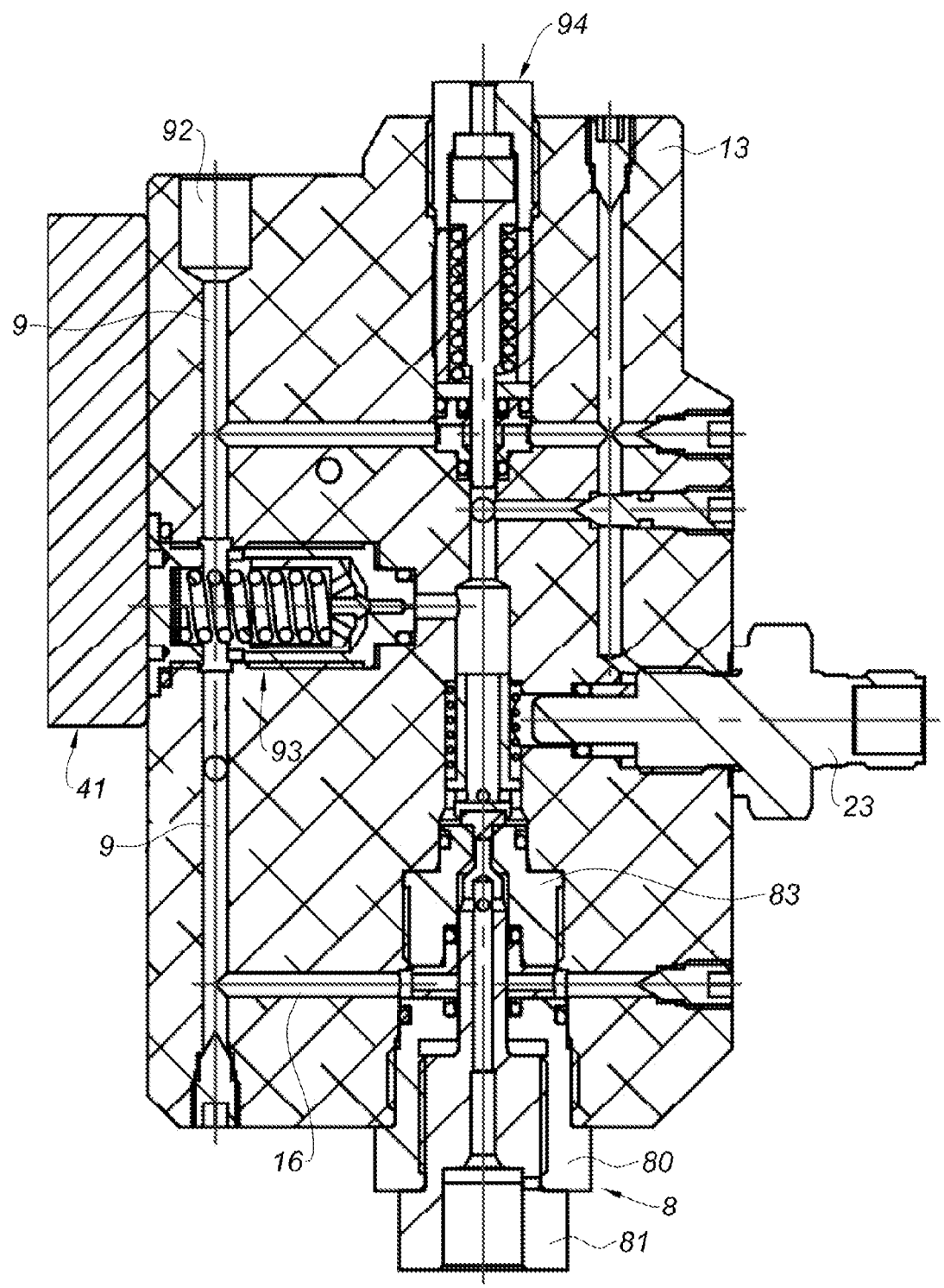
FIG. 13 is a schematic cross-sectional view of the device of FIGS. 2 to 7 along the section plane XIII-XIII of FIG. 6.
Figure 14:
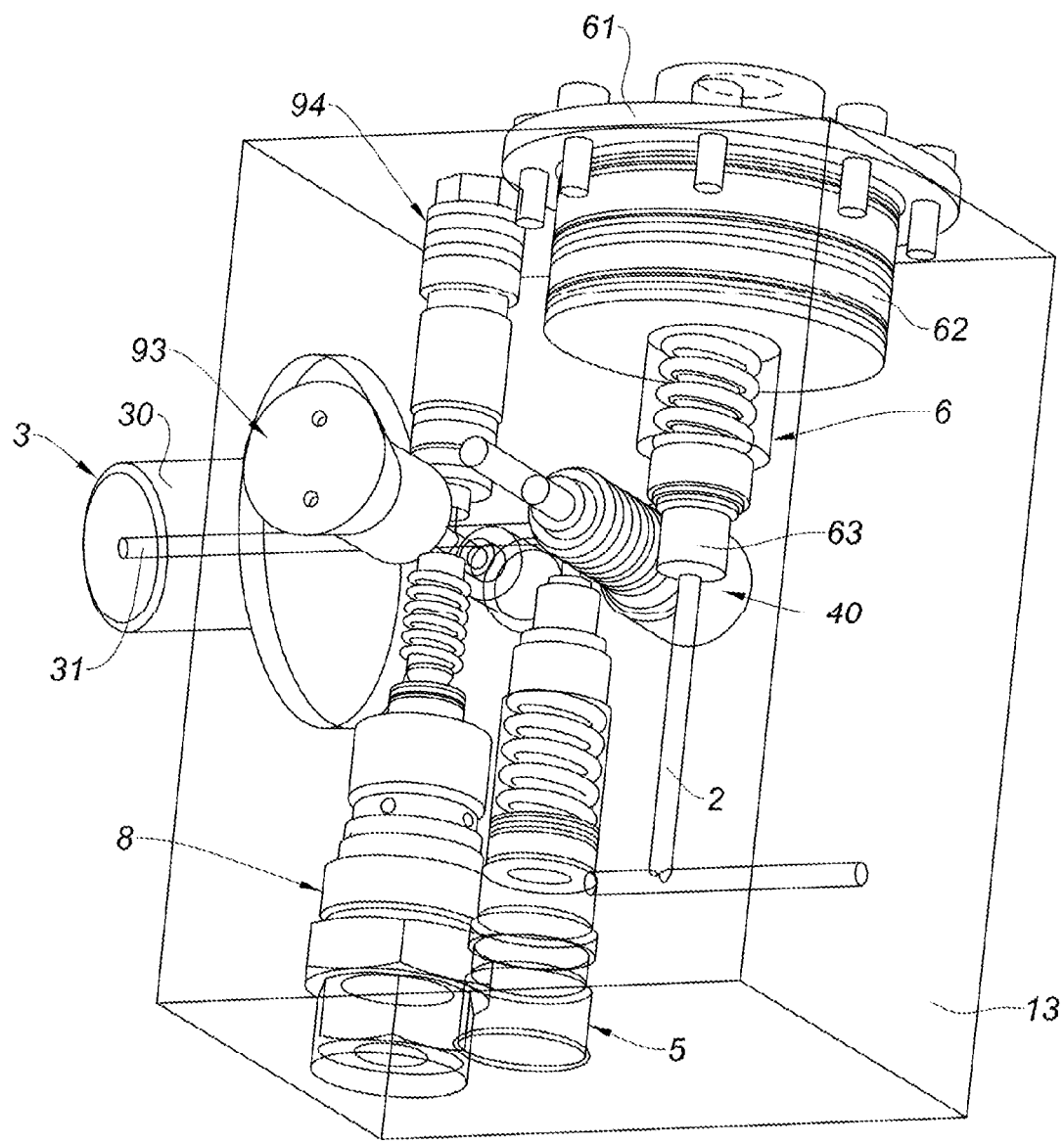
FIG. 14 is a schematic perspective and partially transparent view of the device of FIGS. 2 to 7.
Figure 15:
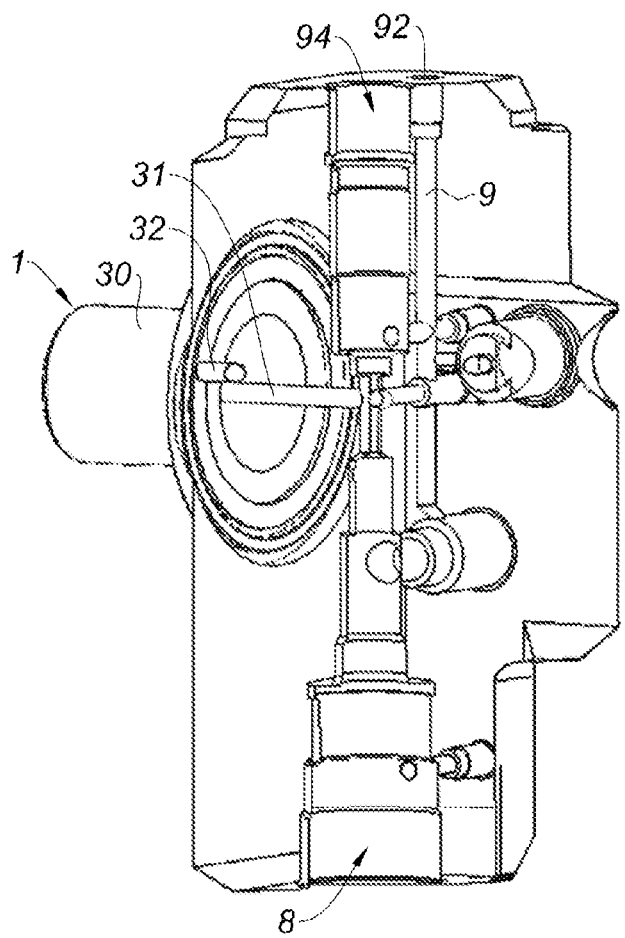
FIGS. 15 to 18 are schematic perspective views of the device of FIGS. 2 to 7 cut along different sectional planes.
Figure 24:
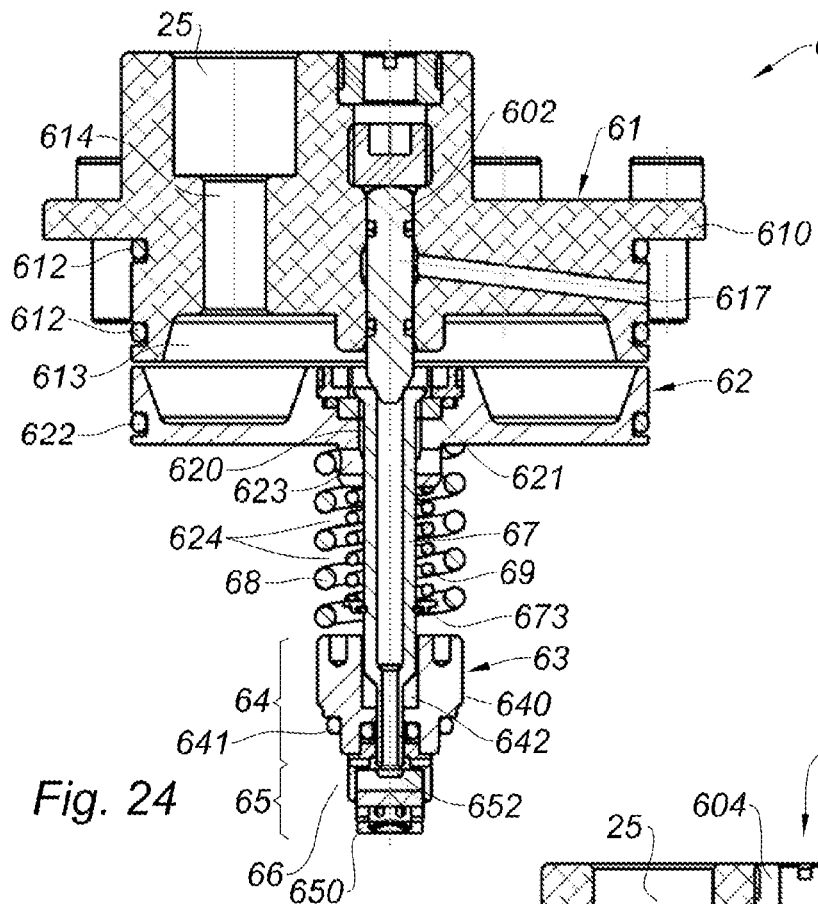
Figure 25:
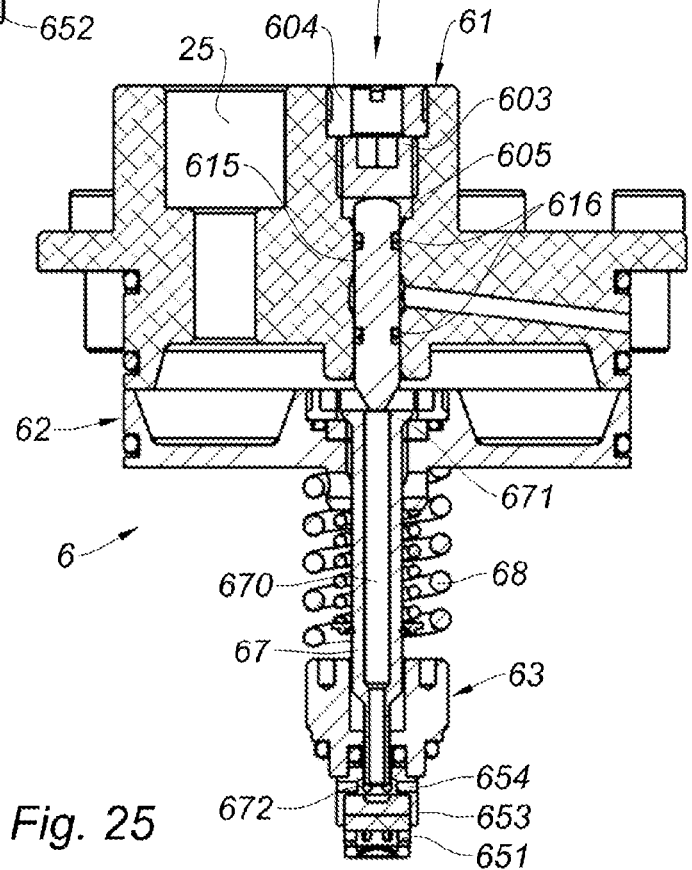
Figure 26:
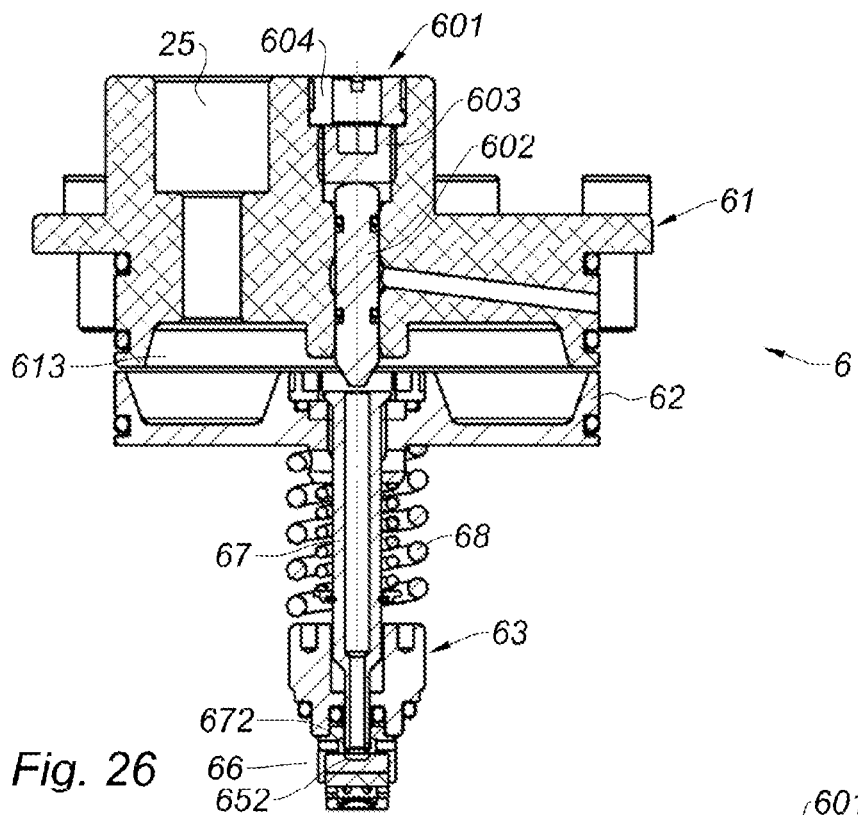
Figure 27:
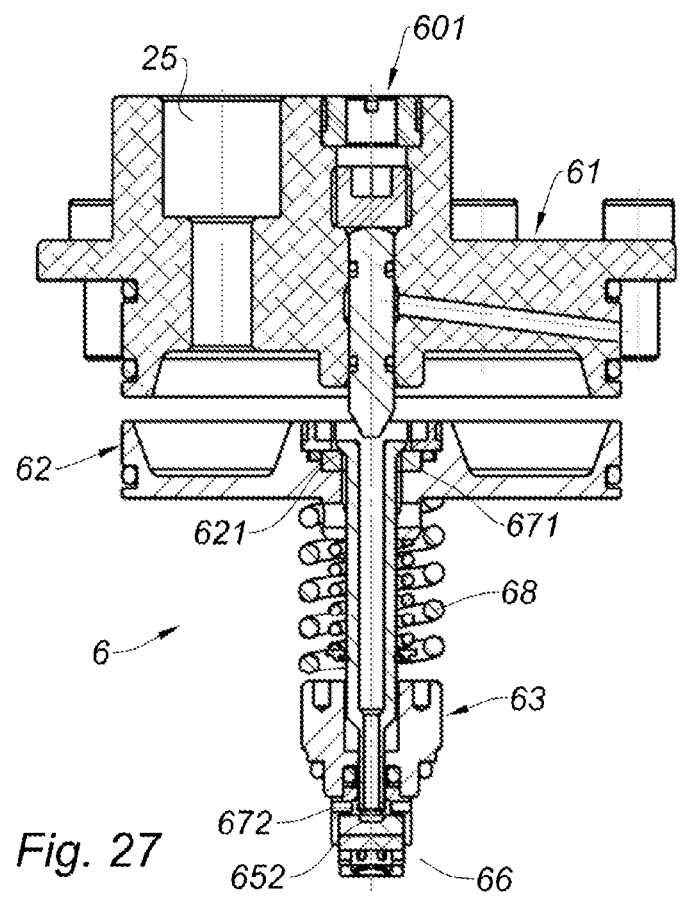
Figure 28:
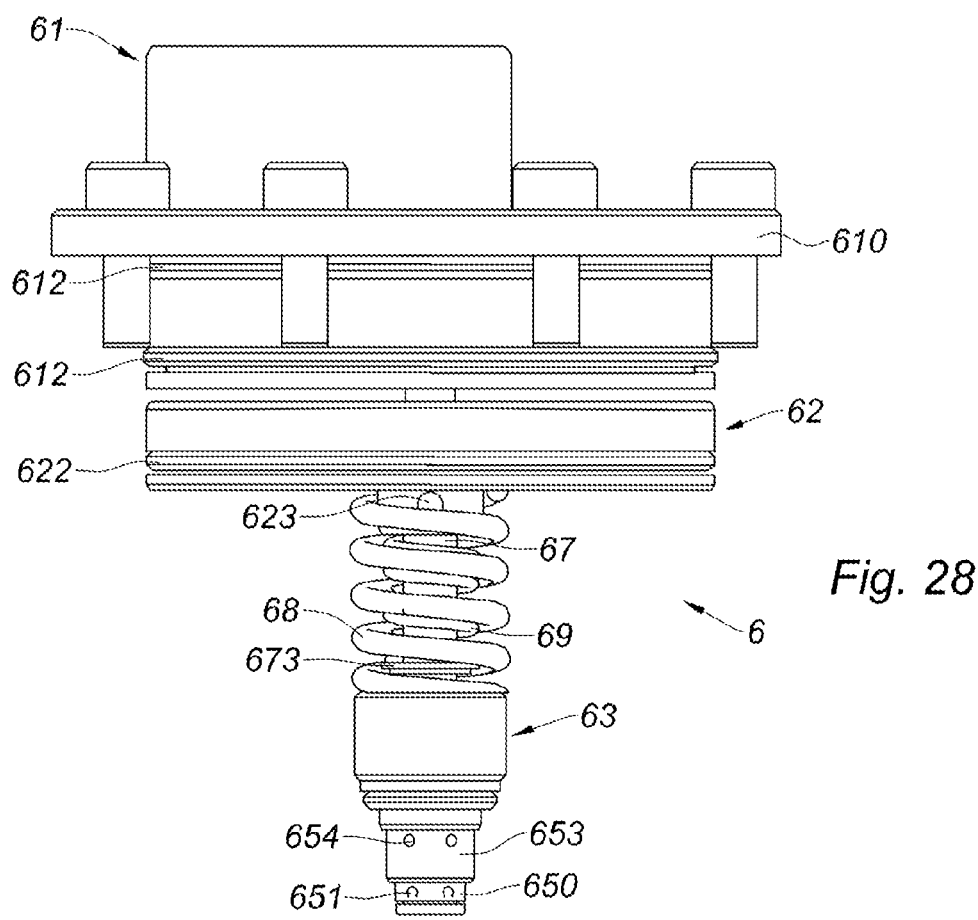
Figure 29:
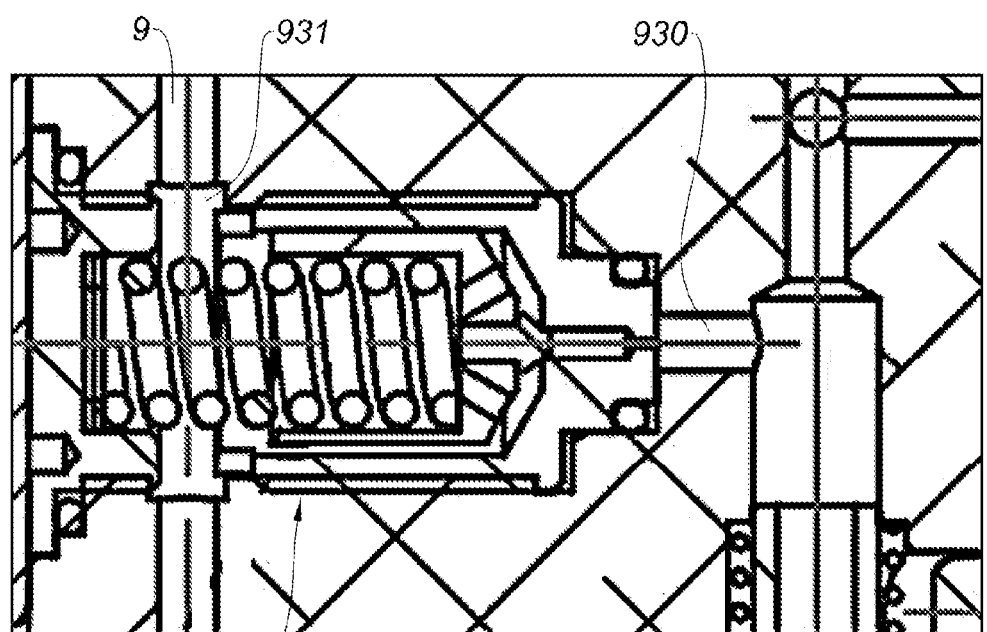
Figure 30:
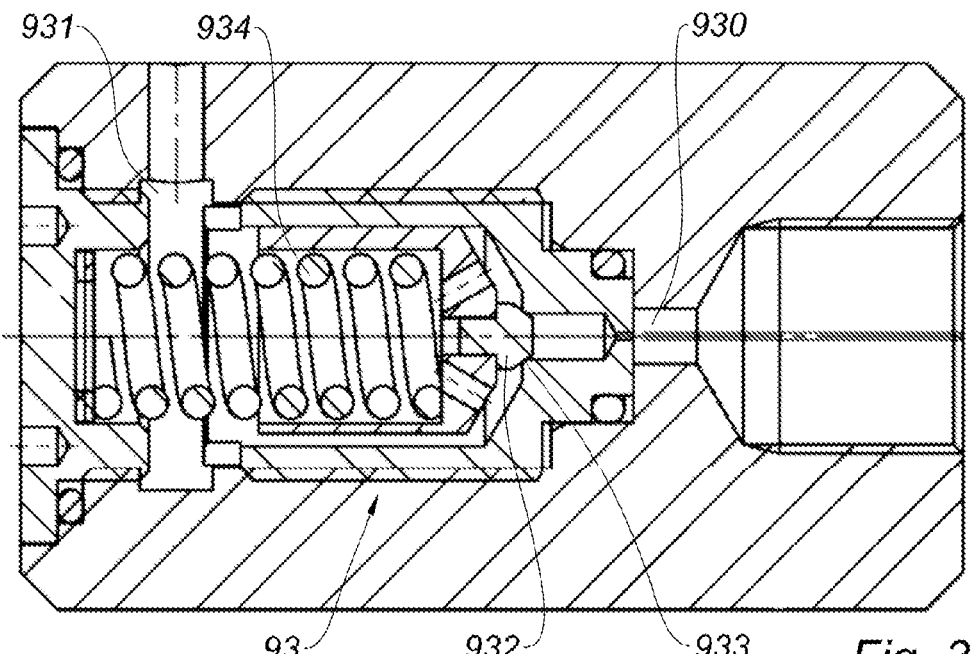
Figure 31:
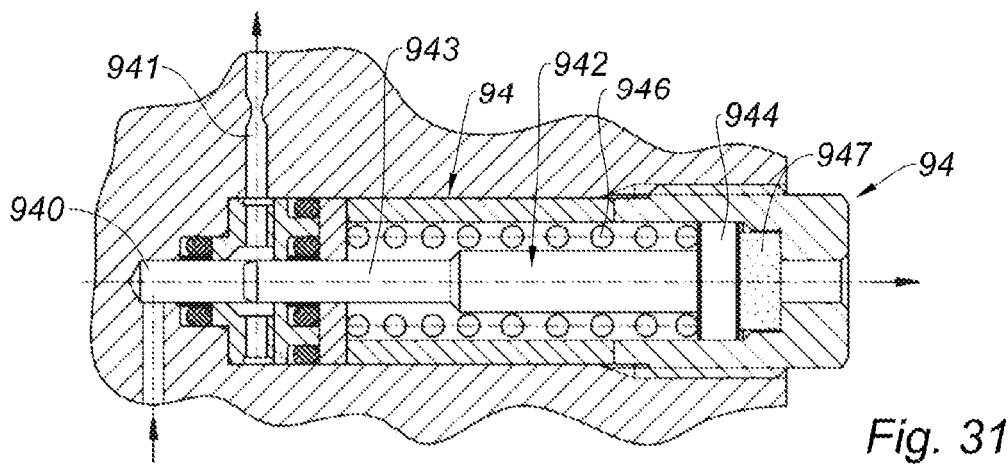
Figure 32:
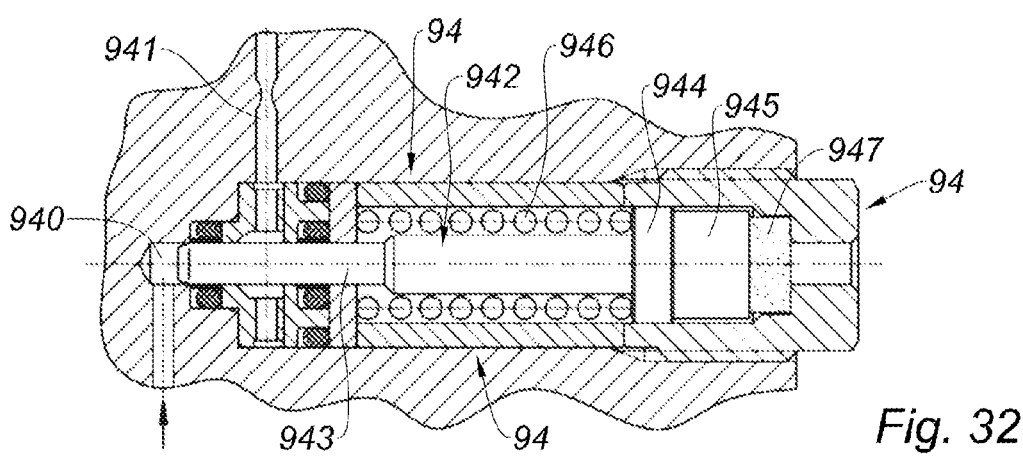

FIGS. 24 to 27 are schematic cross-sectional views of a second pressure regulator, or low pressure regulator, of the device of FIGS. 2 to 7, in a locked configuration prohibiting the regulation (FIG. 24), in a configuration unlocked in the first reset phase after raising the shutter finger (FIG. 25), in a configuration unlocked in the second reset phase (FIG. 26), in an open regulating configuration (FIG. 27);

FIG. 28 is a schematic side view of the second pressure regulator of FIGS. 24 and 27;

FIG. 29 is a close up view of part of FIG. 13 schematically illustrating a cross-sectional view of a high pressure safety valve of the device of FIGS. 2 to 7;

FIG. 30 is a schematic cross-sectional view of the high pressure safety valve of FIG. 29, illustrated in a test body;

FIGS. 31 and 32 are schematic cross-sectional views of a high temperature safety valve of the device of FIGS. 2 to 7, illustrated in a test body, in an open configuration above a threshold temperature (FIG. 31) and in a closed configuration below the threshold temperature (FIG. 32).

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A device 1 for filling and withdrawing gas according to the present disclosure comprises a withdrawing circuit 2 including an upstream end 21 provided with a storage connector 3 configured for a connection with a storage container RE of a pressurized gas, and a downstream end 22 provided with a withdrawing connector 25 configured for a connection with a withdrawing device (not illustrated) of the gas at reduced pressure.

Between these two ends 21, 22, the withdrawing circuit 2 successively comprises, starting from the upstream end 21, a driven isolation gate 4, a first pressure regulator 5 and a second pressure regulator 6. The withdrawing circuit 2 also comprises, upstream of the driven isolation gate 4, a temperature probe 23 and a pressure probe 24.

The first pressure regulator 5 is associated with, or integrates, a discharging valve 50 disposed downstream between the withdrawing circuit 2 and a leakage circuit 10, wherein the discharging valve 50 is configured for a discharge to the leakage circuit 10 in the event of downstream overpressure, that is to say in the event of the downstream pressure being exceeded beyond a first predefined threshold pressure (also called the adjustment value or calibration value).

In other words, if the downstream pressure exceeds the first threshold pressure, a discharging flap of the discharging valve 50 is raised in opposition to the force of a biasing member, so that the discharging valve 50 opens so that the downstream pressure decreases in the leakage circuit 10 (outlet side). The discharging valve 50 closes as soon as the downstream pressure falls below the first threshold pressure.

The second pressure regulator 6 is associated with, or integrates, a discharging valve 60 disposed downstream between the withdrawing circuit 2 and the leakage circuit 10, wherein the discharging valve 60 is configured for a discharge towards the leakage circuit 10 in the event of a downstream overpressure, that is to say in the event of the downstream pressure being exceeded beyond a second predefined threshold pressure (also called the adjustment value or calibration value).

In other words, if the downstream pressure exceeds the second threshold pressure, a discharging flap of the discharging valve 60 is raised in opposition to the force of a biasing member, so that the discharging valve 60 is opened so that the downstream pressure decreases in the leakage circuit 10 (outlet side). The discharging valve 60 is closed as soon as the downstream pressure falls below the second threshold pressure.

The second pressure regulator 6 is followed by a flow limiter 600 with a safety system 601 with manual reset to close the withdrawing circuit 2 in the event of a drop in downstream pressure.

The device 1 also comprises a filling circuit 7 comprising an upstream end 71 provided with a filling connector 8 configured for a connection with a source of pressurized gas SO for filling the storage container RE, and a downstream end 72 connected at the upstream end 21 of the withdrawing circuit 2.

The device 1 comprises a safety circuit 9 having an upstream end 91 connected to the upstream end 21 of the withdrawing circuit 2; and an upstream end 92 connected to the outside EXT, the upstream end 92 forming a collection point to the outside.

The safety circuit 9 comprises, in parallel, a high pressure safety valve 93, a high temperature safety valve 94 and a drain tap 95 with a flow limiter. A function of the drain tap 95 is to allow controlled emptying of the storage container RE.

The device 1 comprises the leakage circuit 10 having an outlet connected to the outside EXT, and more specifically connected to the upstream end 92 of the safety circuit 9, and inlets connected to various members of the device 1, as described later, and in particular to the safety valves 50, 60.

The leakage circuit 10 comprises a check valve 11 and a low pressure safety valve 12 having an inlet connected to the downstream end 22 of the withdrawing circuit 2, downstream of the second pressure regulator 6 and also of the flow limiter 600; and an exhaust outlet connected upstream of the check valve 11.

In the described device 1, the safety circuit 9 and the leakage circuit 10 are in communication, and together form one and the same circuit connected to the outside EXT.

The remainder of the description relates to an exemplary form of the device 1, in a compact, light, reliable and secure version.

The device 1 comprises a body 13 in which are formed bores forming channels of the withdrawing circuit 2, the filling circuit 7, the leakage circuit 10 and the safety circuit 9, as well as receiving cavities for the various members of the device 1.

The storage connector 3 comprises a cylindrical connector 30 projecting from one side which is crossed by a main conduit 31 connected to the upstream end 21 of the withdrawing circuit 2, the connector 30 being designed to be connected to the storage container RE so that the gas circulates in the main conduit 31. Of course, the shape of the connector 30 will depend on the connection interface of the storage container RE.

The storage connector 3 also comprises a leakage conduit or duct 32 connected to the leakage circuit 10 and opening between two concentric seals 33, 34; these seals 33, 34 being positioned around the connector 30. Thus, a double sealing barrier is provided between the leakage conduit 32 for improved performance in the event of a leak at the connector 30.

The driven isolation gate 4 comprises a gate 40 controlled by a motor member 41 between a position for closing the withdrawing circuit 2 and a position for opening the withdrawing circuit, with the complementary action of a biasing member 42 which biases the gate 40 towards the closed position in the absence of actuation of the motor member 41.

Figure 20:
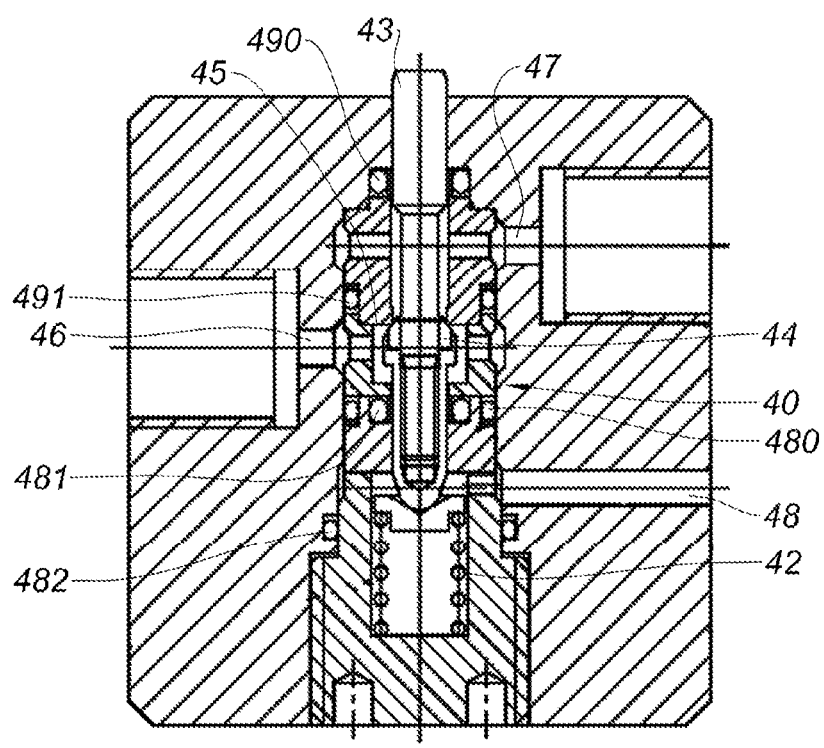
FIG. 20 is a schematic cross-sectional view of a driven isolation gate of the device of FIGS. 2 to 7, illustrated in a test body, without representation of the motorization.

Referring to FIG. 20, the gate 40 comprises a piston 43 displaceable under the action of the motor member 41, the piston 43 having an isolation flap 44 which bears on a seat 45. The motor member 41 controls the displacement of the piston 43 in the direction of a separation of the isolation flap 44 from the seat 45 for an opening of the gate 40 between its inlet 46 and its outlet 47. The biasing member 42, in particular of the helical spring type, for its part exerts a force on the piston 43 to bias it in the direction of a re-compressing of the isolation flap 44 on the seat 45 for closing the gate 40.

The gate 40 integrates a leakage conduit 48 connected to the leakage circuit 10 and disposed upstream of the isolation flap 44, to evacuate towards the leakage circuit 10 any leaks at the level of the bore receiving the gate 40 and also at the level of the movable piston 43. The leakage conduit 48 is framed by seals 480, 481, 482 which allows a double sealing barrier in the management of the leaks.

Figure 11:
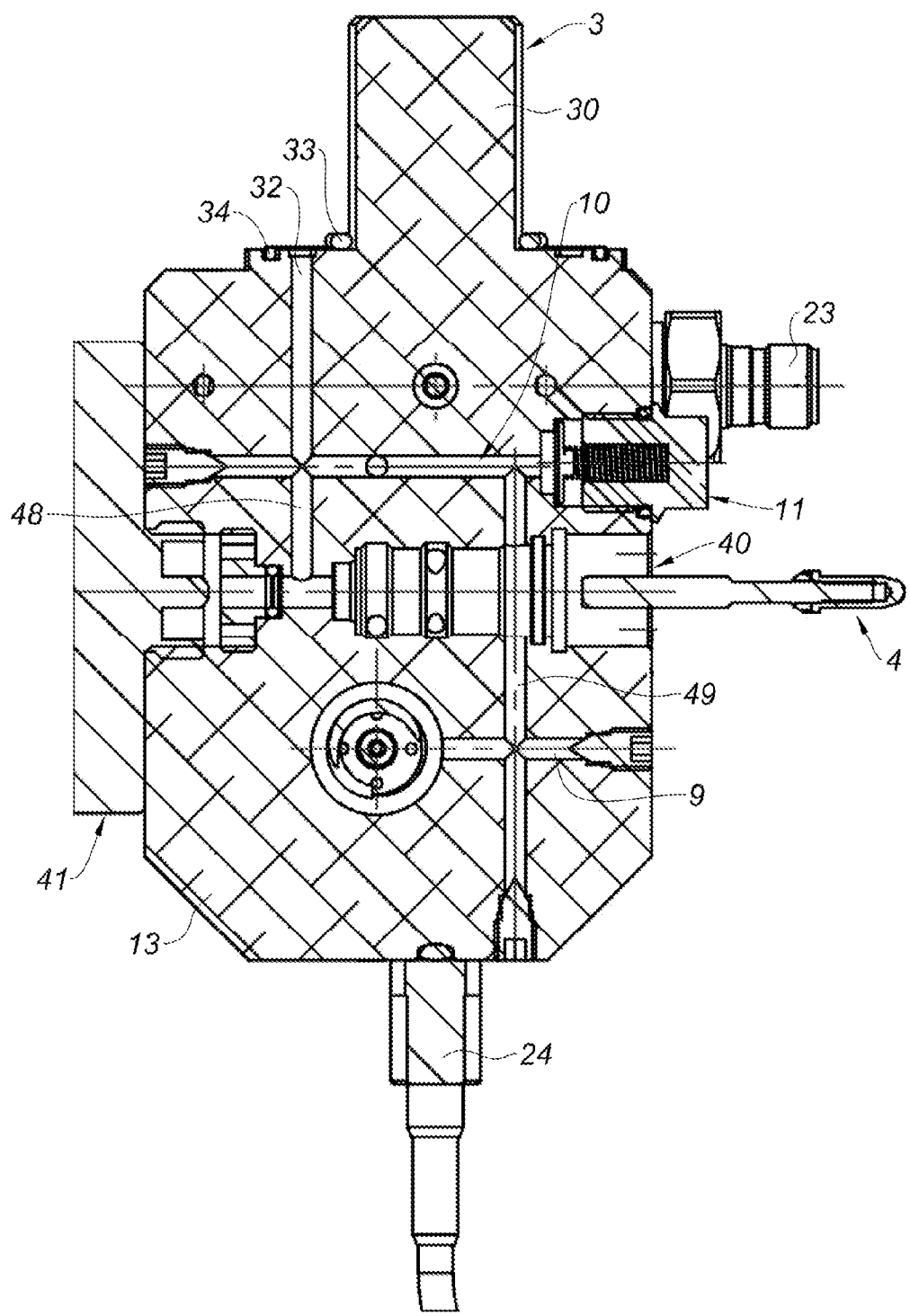
FIG. 11 is a schematic cross-sectional view of the device of FIGS. 2 to 7 along the section plane XI-XI of FIG. 6.
Figure 12:
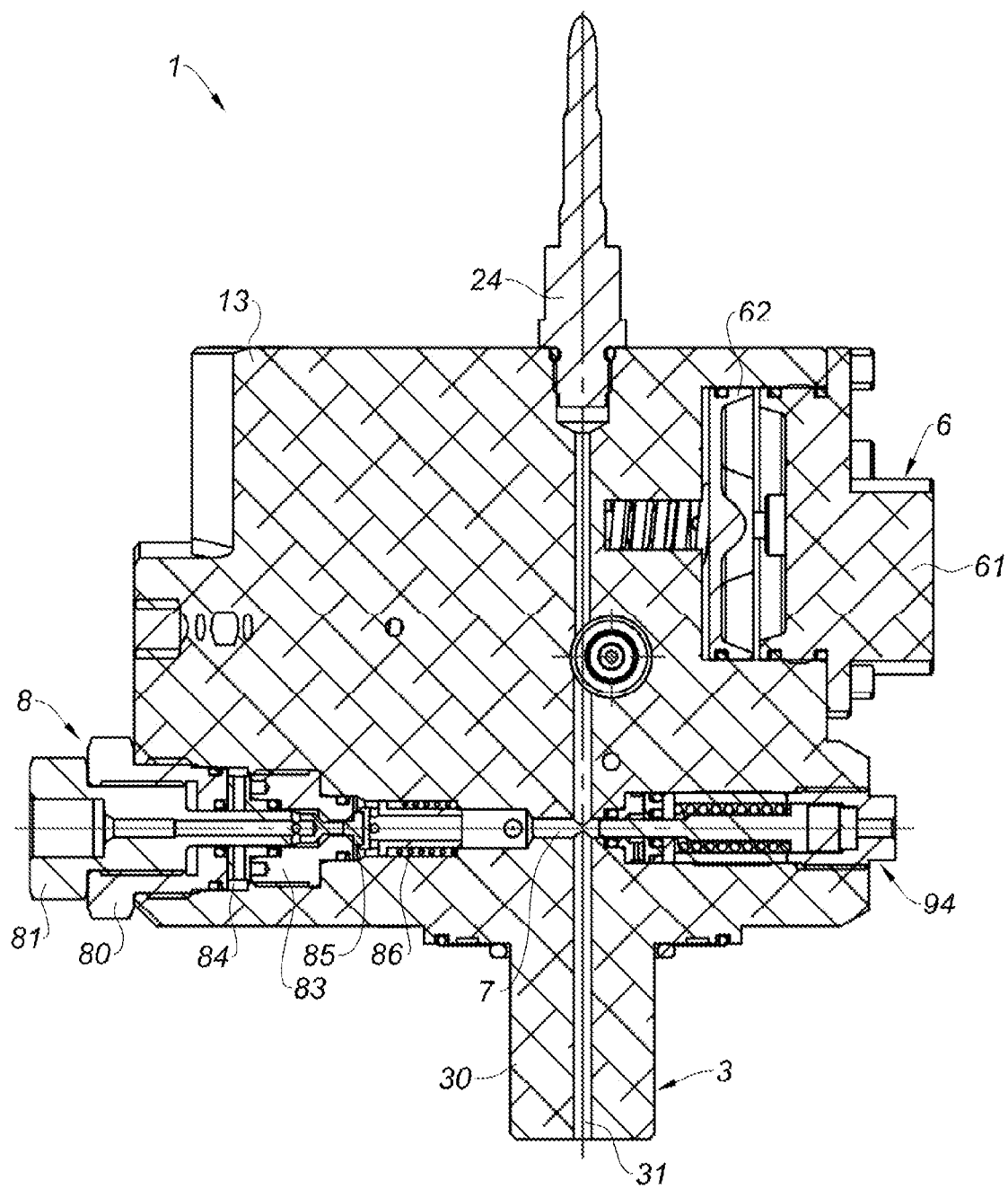
FIG. 12 is a schematic cross-sectional view of the device of FIGS. 2 to 7 along the section plane XII-XII of FIG. 7.

The gate 40 integrates another leakage conduit 49 (visible in FIG. 11) connected to the leakage circuit 10 and disposed downstream of the isolation flap 44, to evacuate towards the leakage circuit 10 any leaks at the level of the bore receiving the gate 40 and also at the level of the movable piston 43. The leakage conduit 49 is framed by seals 490, 491 which allows a double sealing barrier in the management of leaks.

The motor member 41 is mounted in a motor casing 410 fixed to the body 13 and an electrical socket 411 is provided on the outside of the motor casing 410. A wheel 412 is also provided on the outside of the casing 410, wherein the wheel 412 makes it possible to deactivate and remove the motor member 41, so that only the biasing member 42 acts in the direction of closing of the gate 40.

The first pressure regulator 5 is described below with reference to FIGS. 21 to 23, wherein the first pressure regulator 5 is mounted inside a bore whose bottom is in communication with the outlet of the gate 40.

The first pressure regulator 5 comprises a static downstream body 51 forming a cover or plug accessible from the outside and provided with an outer thread 510 for fixing by screwing into the body 13. The downstream body 51 having on an upper face, an upper blind hole 511 for a screwing/unscrewing tool, on the external periphery, two O-ring seals 512 below the outer thread 510, and on a lower face opposite the upper face, a cavity forming a low pressure chamber 513 at the outlet of the first pressure regulator 5. The low pressure chamber 513 being connected to the inlet of the second pressure regulator 6.

Figure 10:
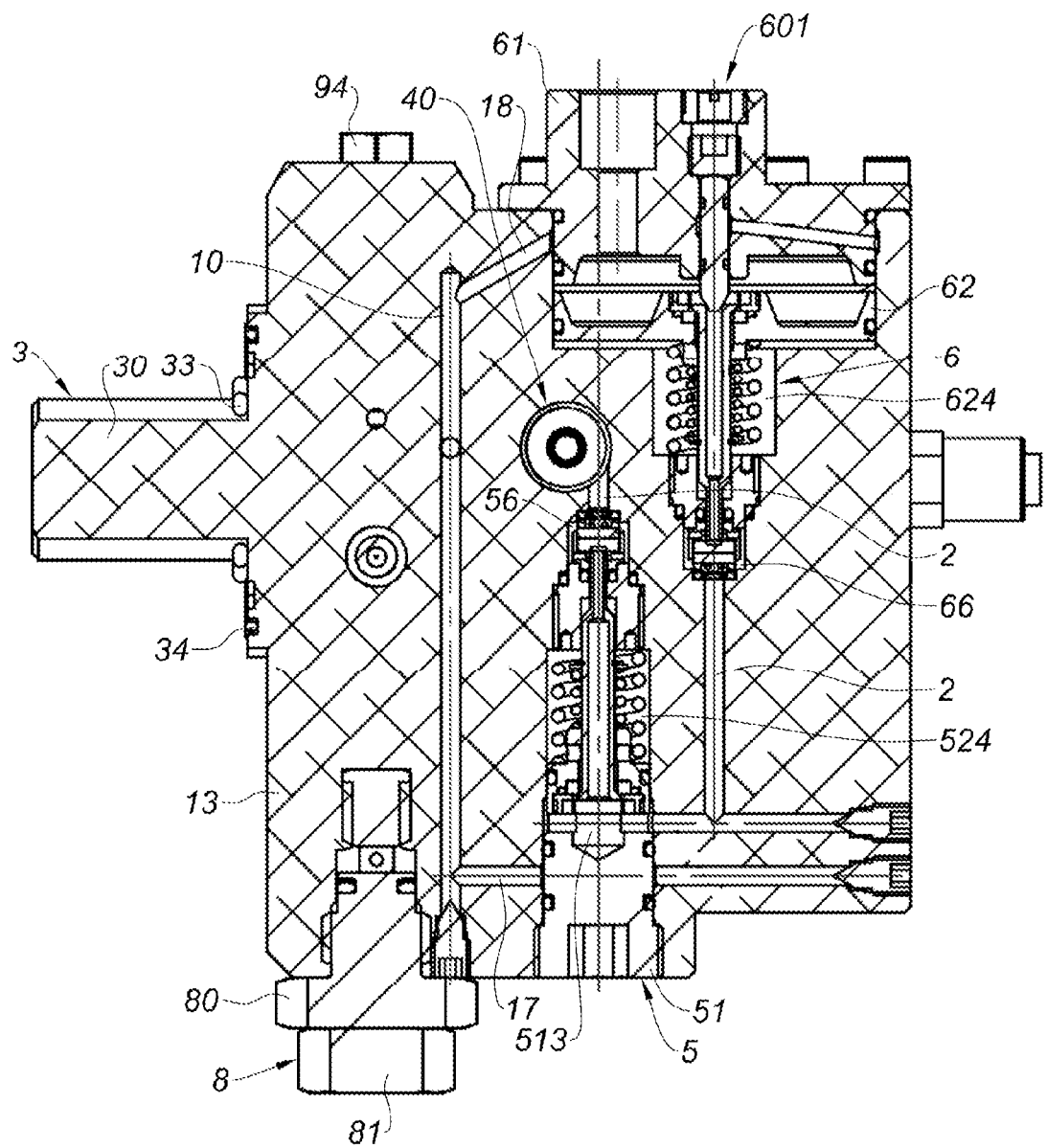
FIG. 10 is a schematic cross-sectional view of the device of FIGS. 2 to 7 along the section plane X-X of FIG. 7.

A leakage conduit or duct 17 (visible in FIG. 10) formed in the body 13 is connected to the leakage circuit 10 and opens into the bore of the first pressure regulator 5 between the two seals 512, again with a double sealing barrier.

The first pressure regulator 5 comprises a regulating part formed of a movable piston 52 shaped to bear on the lower face of the downstream body 51. The piston 52 being provided at the external periphery with an O-ring seal 522 and having an inner channel 520 passing through and having an upper end, on the side of the downstream body 51, facing the low pressure chamber 513 and forming a discharging seat 521, and an opposite lower end 523 which opens onto an intermediate chamber 524.

Figure 17:
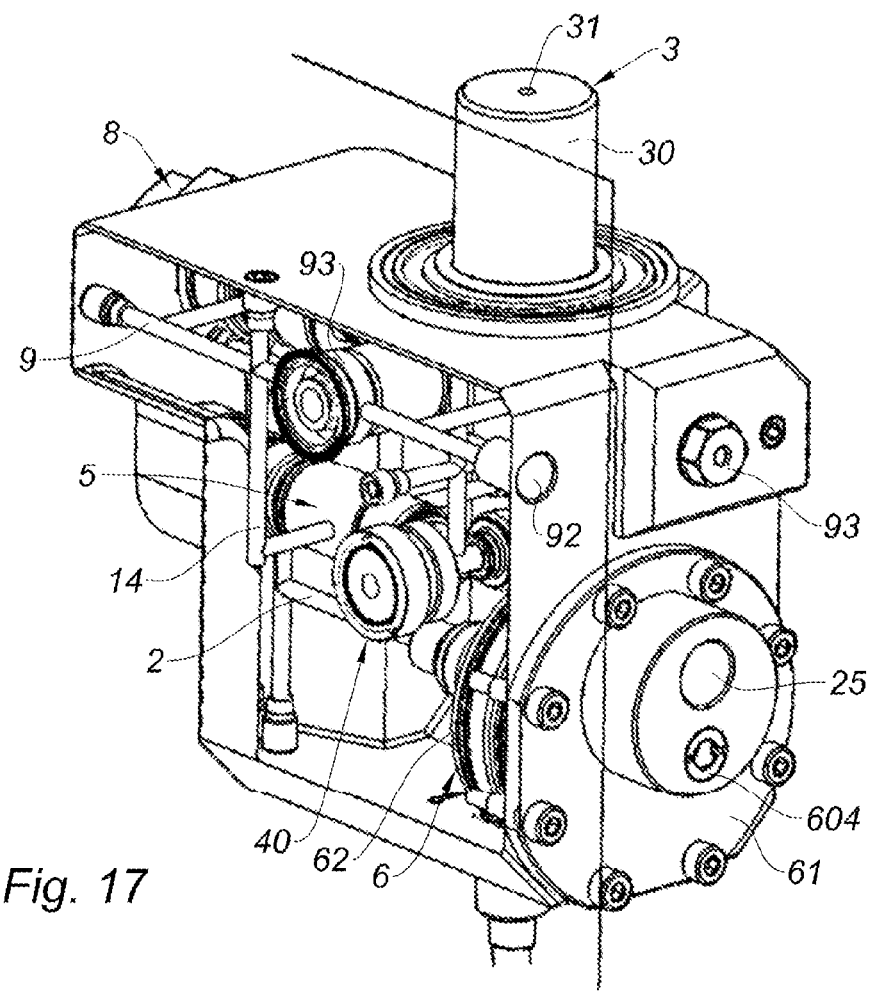
Figure 18:
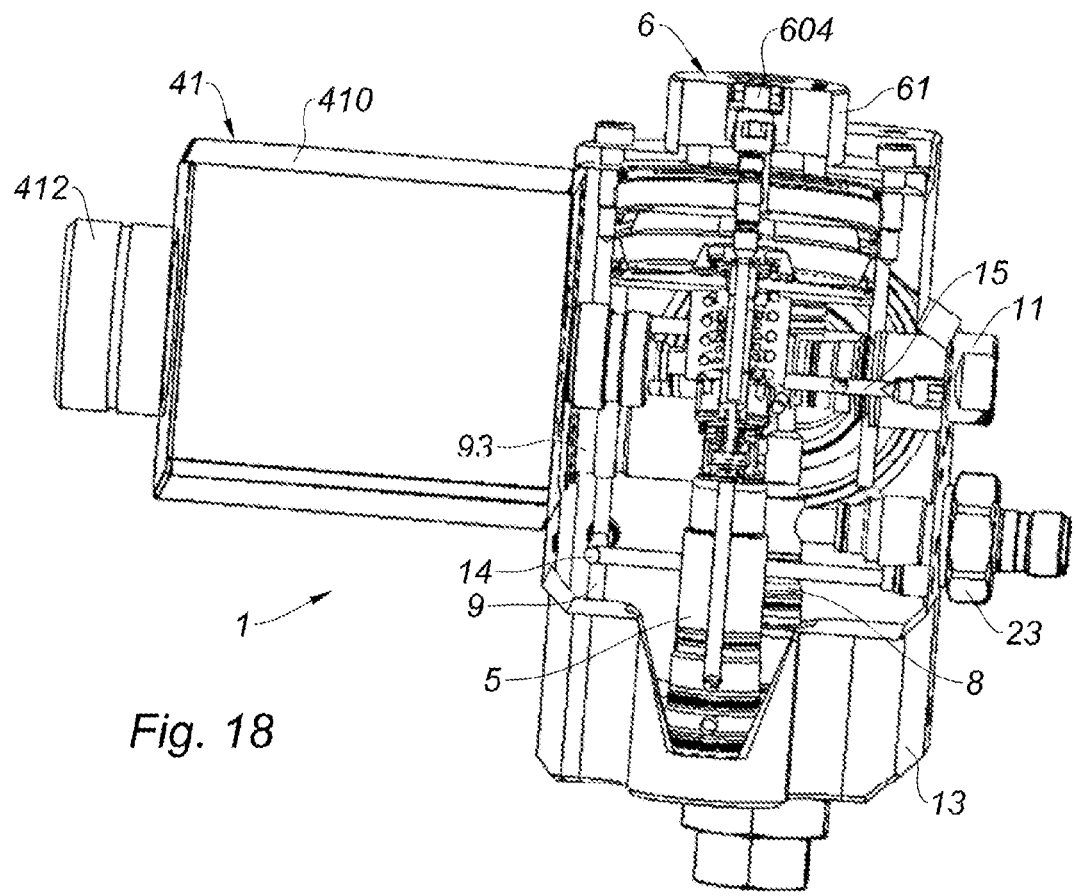

The first pressure regulator 5 comprises a static upstream body 53 having an upper portion 54 extended by a lower portion 55, wherein the upper portion 54 faces the piston 52 so that the intermediate chamber 524 is delimited between the piston 52 and the upper portion 54 of the upstream body 53. The intermediate chamber 524 is connected to the leakage circuit 10 or to the safety circuit 9, via a discharging conduit or duct 14 formed in the body 13 and visible in FIGS. 17 and 18.

The upper portion 54 is provided with an outer thread 540 for fixing by screwing in the body 13, and more specifically for fixing to the bottom of the corresponding bore, until the upper portion 54 abuts on an inner shoulder of the bore via a seal 541.

The upstream body 53 defines with the bottom of the bore, under the inner shoulder, a high pressure chamber 56 at the inlet of the first pressure regulator 5. The high pressure chamber 56 being connected to the outlet of the gate 40.

The upper portion 54 has an inner channel 542 passing through and having an upper end which opens onto the intermediate chamber 524 and a lower end which opens onto the high pressure chamber 56.

The lower portion 55 has a lower dome 550 bearing on the bottom of the bore for an inlet EN of the high pressure gas, wherein the lower dome 550 is provided with lateral holes 551 opening into the high pressure chamber 56.

The lower dome 550 has an upper face facing the lower end of the inner channel 542, and a cavity is formed in the upper face to form an expansion seat 552.

The lower portion 55 comprises a cylindrical wall 553 which surrounds the upper face of the lower dome 550, wherein the cylindrical wall 553 is provided with lateral holes 554 opening into the high pressure chamber 56.

Thus, at the inlet, the gas enters inside the lower dome 550 as shown diagrammatically by the arrow EN in FIG. 21, then the gas leaves the high pressure chamber 56 through the lateral holes 551 and enters at the level of the expansion seat 552 through the lateral holes 554 as shown diagrammatically by the arrow CH in FIG. 21. The gas flow advantageously participates in the desired gas expansion function.

The first pressure regulator 5 comprises a tubular valve rod 57 provided with an inner channel 570, the valve rod 57 passing through both the inner channel 520 of the piston 52 and the inner channel 542 of the upper portion 54 of the upstream body 53, so that the valve rod 57 has a flared upper end forming a discharging flap 571 suitable for bearing on the discharging seat 521 (in other words on the upper end of the inner channel 520); and a lower end forming a regulating flap 572 suitable for bearing on the expansion seat 552.

The regulating flap 572 is movable relative to the expansion seat 552 between an upstream position for closing the communication between the low pressure chamber 513 and the high pressure chamber 56 (via the inner channel 570), wherein the regulating flap 572 is in abutment on the expansion seat 552; and a downstream position for opening the communication between the low pressure chamber 513 and the high pressure chamber 56 (via the inner channel 570), wherein the regulating flap 572 is detached from the expansion seat 552.

The discharging flap 571 is movable relative to the discharging seat 521 between an upstream position for closing the communication between the low pressure chamber 513 and the intermediate chamber 524 (via the inner channel 520), wherein the discharging flap 571 is in abutment on the discharging seat 521; and a downstream position for opening the communication between the low pressure chamber 513 and the intermediate chamber 524 (via the inner channel 520), wherein the discharging flap 571 is detached from the discharging seat 521.

The first pressure regulator 5 also comprises a first biasing member 58, in this case a helical spring, compressed between the piston 52 and the upstream body 53 and biasing the piston 52 in the direction of the downstream body 51 (in other words in the direction of pressing of the piston 52 against the downstream body 51).

The first pressure regulator 5 also comprises a second biasing member 59, in this case a helical spring, compressed between the piston 52 and a plate 573 secured to the valve rod 57. The second biasing member 59 extends to the interior of the first biasing member 58, and the plate 573 may for example be formed of a circlip tightened around the valve rod 57. The second biasing member 59 biases the valve rod 57, relative to the piston 52, in the direction of a pressing of the discharging flap 571 against the discharging seat 521, in other words in the direction of the discharging flap 571 towards the upstream closed position.

The following description relates to the operation of the first pressure regulator 5.

With reference to FIG. 21, in a rest configuration, that is to say in the absence of pressure at the inlet (gate 40 closed) and at the outlet of the first pressure regulator 5, the piston 52 is in abutment on the lower face of the downstream body 51 under the action of the first biasing member 58, the discharging flap 571 is in the upstream closed position under the action of the second biasing member 59, and the regulating flap 572 is in the downstream open position, so that the first pressure regulator 5 is open.

With reference to FIG. 21, in a regulating configuration, that is to say with the presence of a high pressure at the inlet (gate 40 open) to be regulated to deliver a reduced pressure at the outlet, the regulating flap 572 is in the downstream opening position and the expansion takes place at the expansion seat 552, the gas passing through the inner channel 570 of the valve rod 57 to reach the low pressure chamber 513; the pressure in the low pressure chamber 513 acts on the piston 52 in the direction of separation from the downstream body 51, so that the regulation is established in the first pressure regulator 5; and the discharging flap 571 is in the upstream closed position under the action of the second biasing member 59.

Referring to FIG. 22, in a closed discharging configuration in the event of an overpressure in the low pressure chamber 513, that is to say in the case where the downstream pressure (or pressure in the low pressure chamber 513) exceeds a first predefined threshold pressure (which depends on the gas bearing surfaces and the spring coefficients of the biasing members 58, 59), the overpressure in the low pressure chamber 513 acts on the piston 52 in the direction of a separation from the downstream body 51 sufficient for the regulating flap 572 to be in the upstream closed position, under the effect of the second biasing member 59 which pushes the valve rod 57; the valve rod 57 being in abutment on the expansion seat 552 and the piston 52 being sufficiently spaced from the downstream body 51, the discharging flap 571 takes off from the discharging seat 521 and thus passes into the downstream open position, authorizing the communication between the low pressure chamber 513 and the discharging conduit 14 connected to the leakage circuit 10, and thus the discharge takes place in the leakage circuit 10 and the downstream pressure is released.

Figure 1:
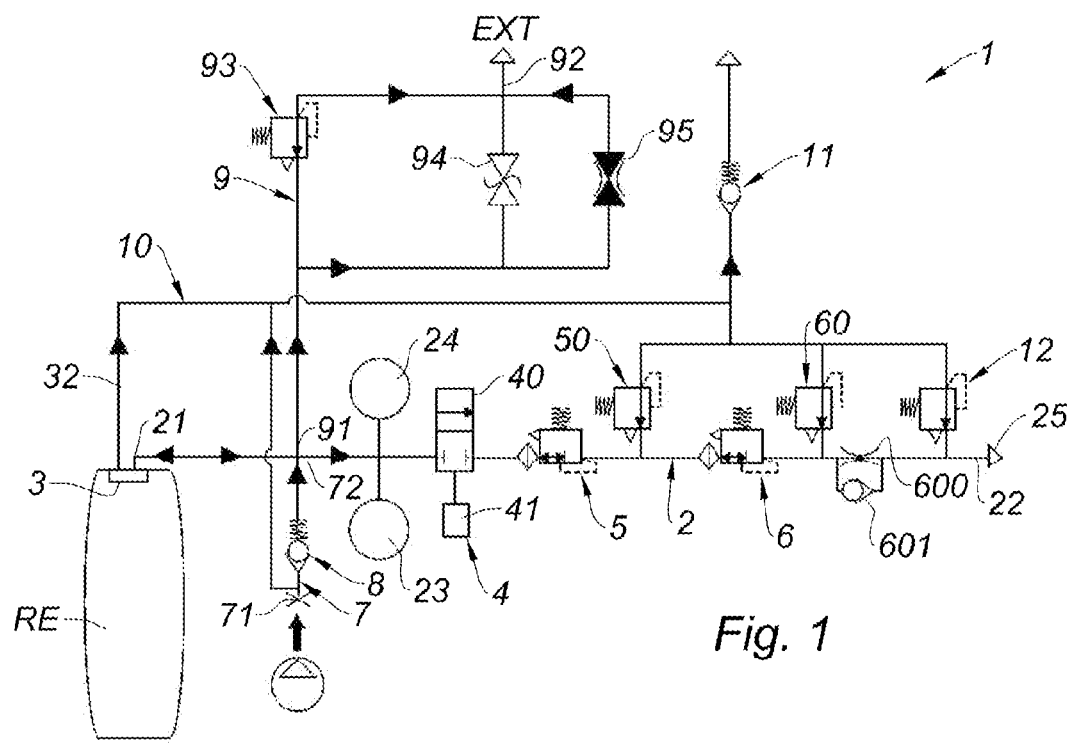
FIG. 1 is a schematic view illustrating the structure of one form of a filling and withdrawing device according to the present disclosure.
Figure 2:
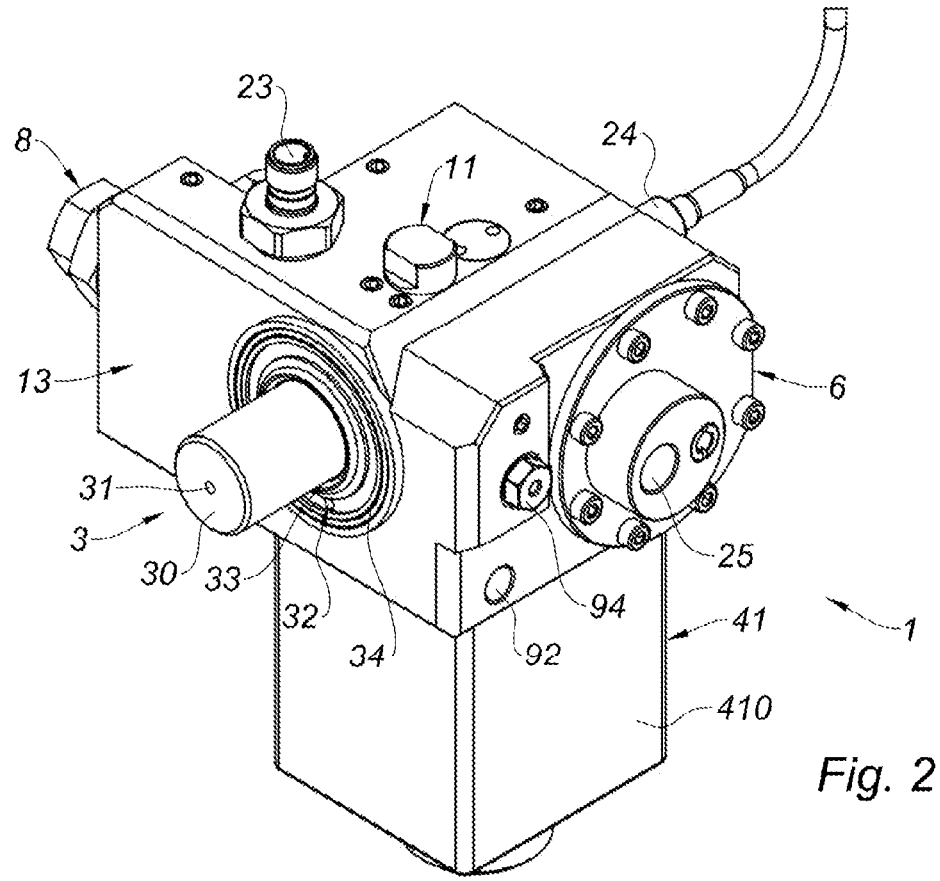
FIGS. 2 to 5 are schematic perspective views and from different viewing angles of a filling and withdrawing device according to the present disclosure.
Figure 3:
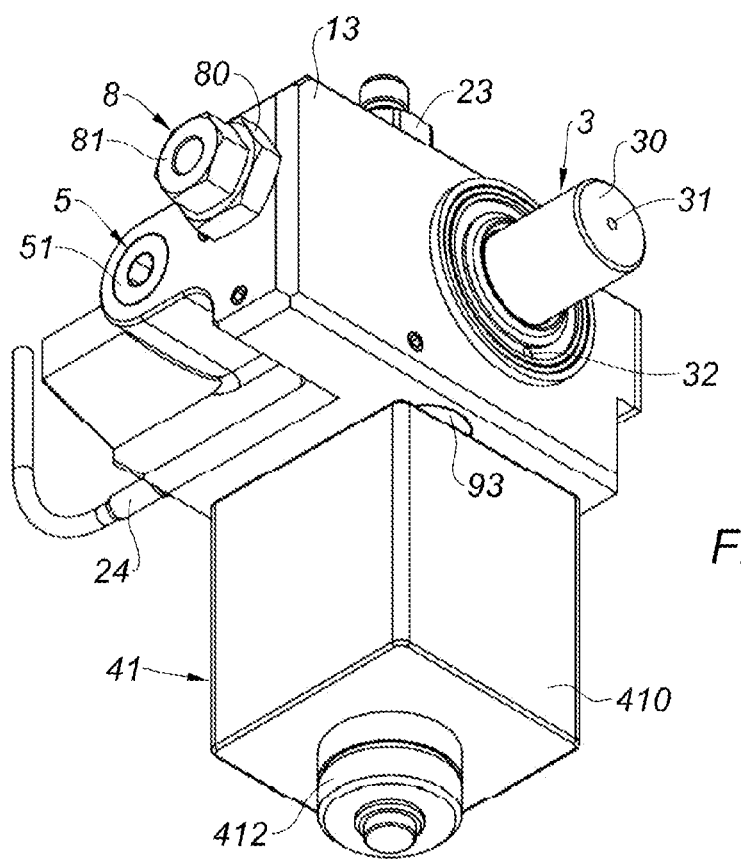
Figure 4:
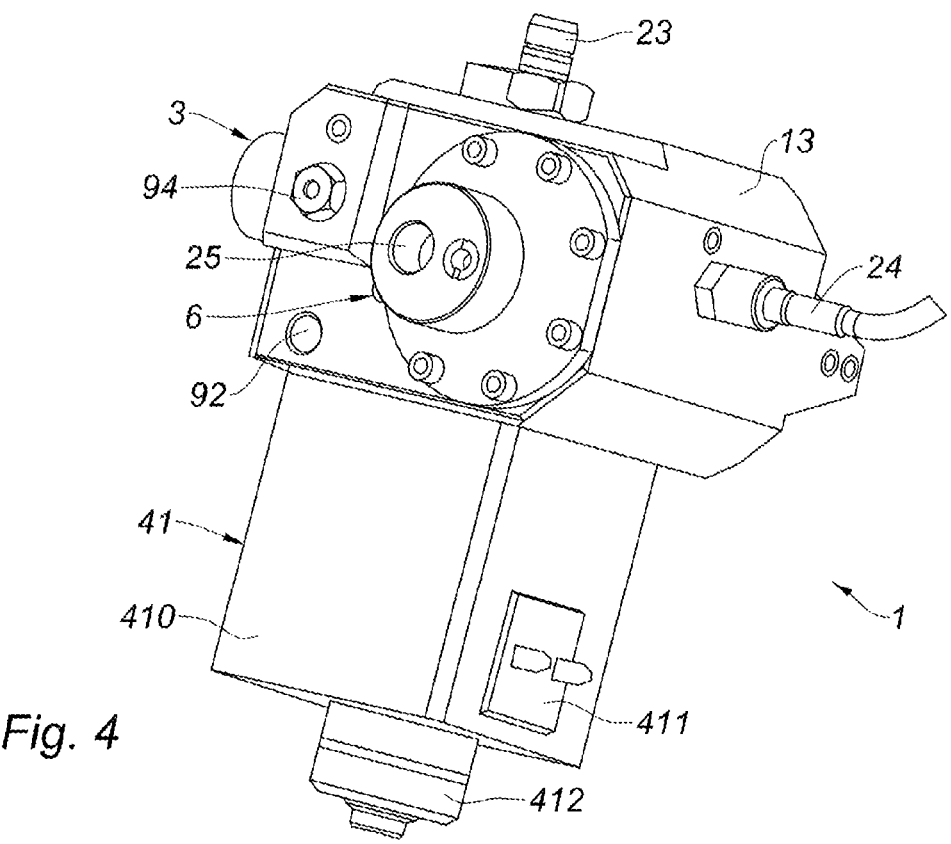
Figure 5:
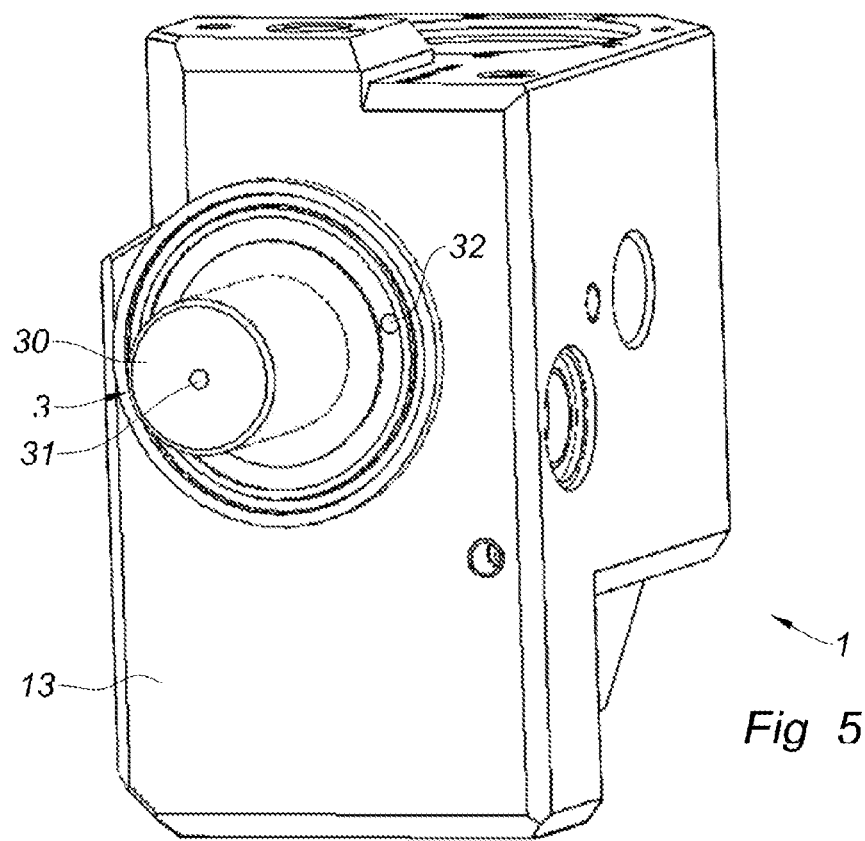
Figure 6:
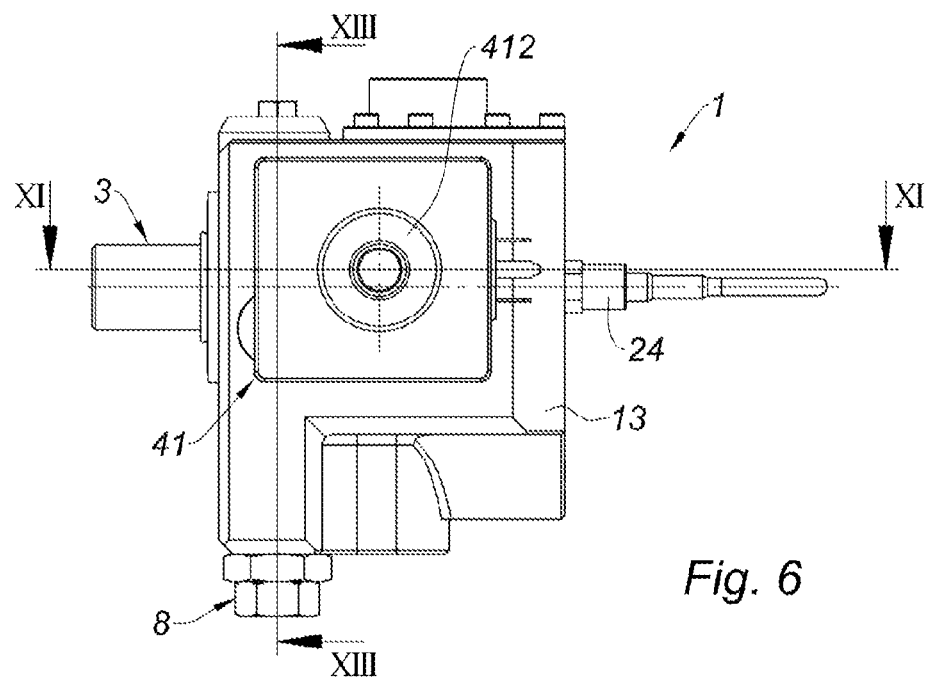
FIGS. 6 and 7 are schematic side views of the device of FIGS. 2 to 5.
Figure 7:
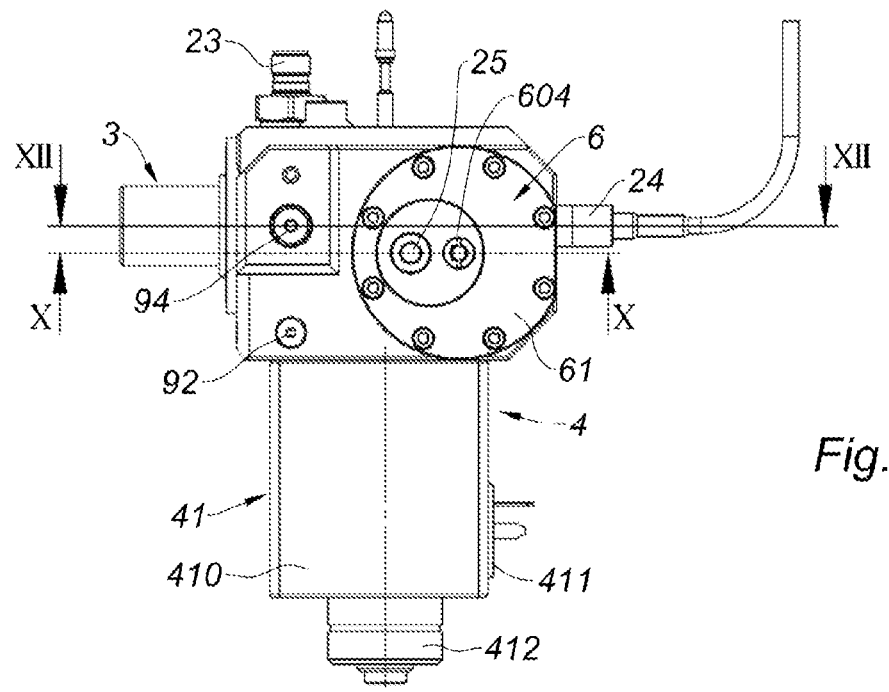

In the first pressure regulator 5, the discharging flap 571 and the second biasing member 59 together form the discharging valve 50 mentioned previously with reference to FIG. 1.

The second pressure regulator 6 is described below with reference to FIGS. 24 to 28, wherein the second pressure regulator 6 is mounted inside a bore whose bottom is in communication with the outlet of the first pressure regulator 5.

The second pressure regulator 6 comprises a static downstream body 61 forming a cover or plug accessible from the outside and provided with a peripheral bearing 610 for fixing by means of several screws on the body 13. The downstream body 61 having on the outer periphery, two O-ring seals 612 below the peripheral bearing 610, on an upper (or outer) face, a threaded orifice forming the withdrawing connector 25 (female connector) to the downstream end 22 of the withdrawing circuit 2; and on a lower face opposite the upper face, a cavity forming a low pressure chamber 613 at the outlet of the second pressure regulator 6, the low pressure chamber 613 being connected to the withdrawing connector 25 via an internal conduit 614.

A leakage conduit or duct 18 (visible in FIG. 10) formed in the body 13 is connected to the leakage circuit 10 and opens into the bore of the second pressure regulator 6 between the two seals 612, again with a double sealing barrier.

The second pressure regulator 6 comprises a regulating part formed of a movable piston 62 shaped to bear on the lower face of the downstream body 61. The piston 62 being provided at the outer periphery with an O-ring seal 622 and having an inner channel 620 passing through and having an upper end, on the side of the downstream body 61, facing the low pressure chamber 613 and forming a discharging seat 621, and an opposite lower end 623 which opens onto an intermediate chamber 624.

Figure 16:
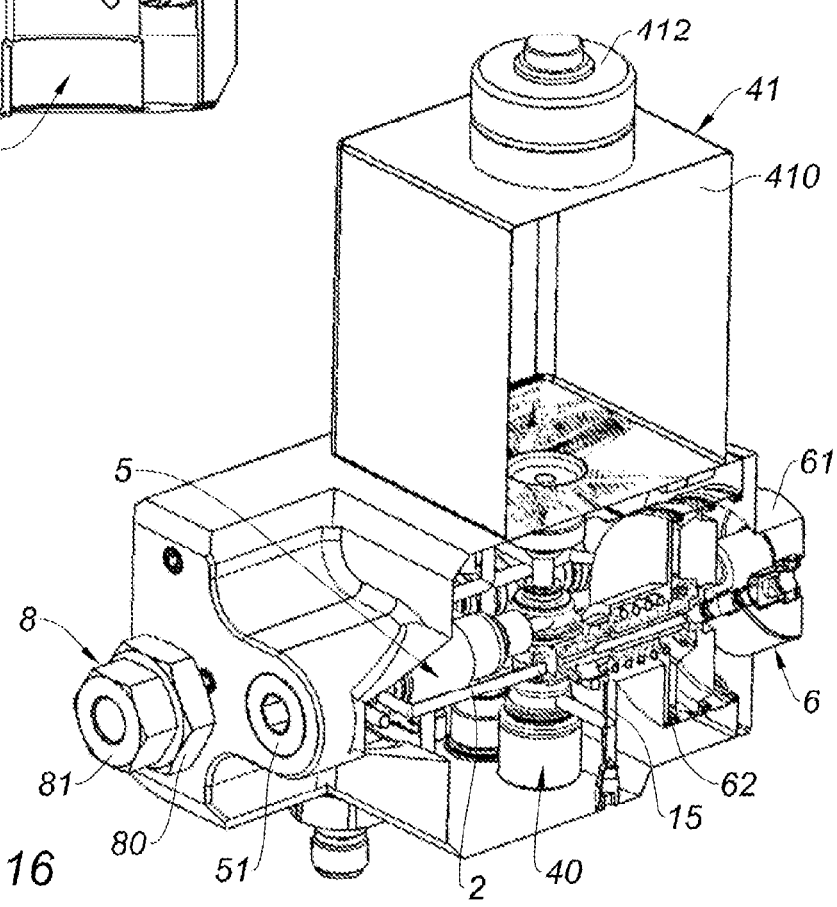

The second pressure regulator 6 comprises a static upstream body 63 having an upper portion 64 extended by a lower portion 65, wherein the upper portion 64 faces the piston 62 so that the intermediate chamber 624 is delimited between the piston 62 and the upper portion 64 of the upstream body 63. The intermediate chamber 624 is connected to the leakage circuit 10 or to the safety circuit 9, via a discharging conduit or duct 15 formed in the body 13 and visible in FIGS. 16 and 18.

The upper portion 64 is provided with an outer thread 640 for a fixing by screwing in the body 13, and more specifically for a fixing to the bottom of the corresponding bore, until the upper portion 64 abuts on an inner shoulder of the bore via a seal 641.

The upstream body 63 delimits with the bottom of the bore, under the inner shoulder, a high pressure chamber 66 at the inlet of the second pressure regulator 6. The high pressure chamber 66 being connected to the outlet of the first pressure regulator 5, in other words to the low pressure chamber 513 of the first pressure regulator 5.

The upper portion 64 has an inner channel 642 passing through and having an upper end which opens onto the intermediate chamber 624 and a lower end which opens into the high pressure chamber 66.

The lower portion 65 has a lower dome 650 bearing on the bottom of the bore for an inlet EN of the high pressure gas, wherein the lower dome 650 is provided with lateral holes 651 opening into the high pressure chamber 66.

The lower dome 650 has an upper face facing the lower end of the inner channel 642, and a cavity is formed in the upper face to form an expansion seat 652.

The lower portion 65 comprises a cylindrical wall 653 which surrounds the upper face of the lower dome 650, wherein the cylindrical wall 653 is provided with lateral holes 654 opening into the high pressure chamber 66.

Thus, at the inlet, the gas enters the interior of the lower dome 650, then the gas leaves the high pressure chamber 66 through the lateral holes 651 and enters at the level of the expansion seat 652 through the lateral holes 654. The gas path advantageously participates in the desired gas expansion function.

The second pressure regulator 6 comprises a tubular valve rod 67 provided with an inner channel 670, the valve rod 67 passing through both the inner channel 620 of the piston 62 and the inner channel 642 of the upper portion 64 of the upstream body 63, so that the valve rod 67 has a flared upper end forming a discharging flap 671 suitable for bearing on the discharging seat 621 (in other words on the upper end of the inner channel 620); and a lower end forming a regulating flap 672 suitable for bearing on the expansion seat 652.

The regulating flap 672 is movable relative to the pressure discharging seat 621 between an upstream position for closing the communication between the low pressure chamber 613 and the high pressure chamber 66 (via the inner channel 670), wherein the regulating flap 672 is in abutment on the expansion seat 652; and a downstream position for opening the communication between the low pressure chamber 613 and the high pressure chamber 66 (via the inner channel 670), wherein the regulating flap 672 is detached from the expansion seat 652.

The discharging flap 671 is movable relative to the discharging seat 621 between an upstream position for closing the communication between the low pressure chamber 613 and the intermediate chamber 624 (via the inner channel 620), wherein the discharging flap 671 is in abutment on the discharging seat 621; and a downstream position for opening the communication between the low pressure chamber 613 and the intermediate chamber 624 (via the inner channel 620), wherein the discharging flap 671 is detached from the discharging seat 621.

The second pressure regulator 6 also comprises a first biasing member 68, in this case a helical spring, compressed between the piston 62 and the upstream body 63 and biasing the piston 62 towards the downstream body 61 (in other words in the direction of a pressing of the piston 62 against the downstream body 61).

The second pressure regulator 6 also comprises a second biasing member 69, in this case a helical spring, compressed between the piston 62 and a plate 673 secured to the valve rod 67. The second biasing member 69 extends to the interior of the first biasing member 68, and the plate 673 may for example be formed of a circlip tightened around the valve rod 67. The second biasing member 69 biases the valve rod 67, relative to the piston 62, in the direction of a pressing of the discharging flap 671 against the discharging seat 621, in other words in the direction of the discharging flap 671 towards the upstream closed position.

The second pressure regulator 6 is thus relatively close to the first pressure regulator described above, with a first difference which lies in a difference in the dimensions because the upstream pressure of the second pressure regulator 6 corresponds to the downstream pressure of the first pressure regulator 5, in other words at the pressure relieved by the first pressure regulator 5.

The first pressure regulator 5 has the function of expanding a high pressure, in particular in the range of 350 to 700 bars, in order to deliver a medium pressure at the outlet, in particular in the range of 10 to 30 bars, and the second pressure regulator 6 has the function of expanding the medium pressure, in particular in the range of 10 to 30 bars, in order to deliver a low pressure at the outlet, in particular in the range of 0.5 to 5 bars.

Thus, the piston 62 of the second pressure regulator 6 has an upper face whose area is greater than that of the piston 52 of the first pressure regulator 5. The biasing members 68, 69 also have spring coefficients different from those of the biasing members 58, 59.

A second difference is that the second pressure regulator 6 comprises a safety system 601, with manual reset, in the event of a pressure drop in the low pressure chamber 613 (equivalent to an over-flow at the outlet of the second pressure regulator 6) which would result in a downstream leak, and in particular a leak in the withdrawing device.

Such a safety system 601 has the following functions: shutting off the communication between the low pressure chamber 613 and the high pressure chamber 66 in the event that the downstream pressure (pressure in the low pressure chamber 613) drops below a low threshold pressure PSB (or set value); prohibiting the second pressure regulator 6 to be put back into operation while the pressure drop fault (or leak in the withdrawing device) has not been resolved; and allowing the second pressure regulator 6 to be put back into operation only by manual reset, once the pressure drop fault (or a leak in the withdrawing device) has been resolved.

The low threshold pressure PSB can be established by considering a maximum value QM of gas flow at the outlet of the second pressure regulator 6 which is considered to be a high threshold not to be exceeded for the flow because it reflects a malfunction at the level of the withdrawing device which may correspond to a leak. The maximum value QM is then to be compared to a difference between the nominal pressure at the outlet of the second pressure regulator 6 (which corresponds to the operating pressure by the withdrawing device) and the low threshold pressure PSB.

The safety system 601 comprises a shutter finger 602 movably mounted in the downstream body 61 opposite the open upper end of the valve rod 67, wherein the shutter finger 602 is selectively movable between a lowered position (visible in FIGS. 24 and 27) wherein the shutter finger 602 is brought closer to the open upper end of the valve rod 67 and is thus able to plug the upper end to close the communication between the lower chamber pressure 613 and the high pressure chamber 66; and a raised position (visible in FIGS. 25 and 26) wherein the shutter finger 602 is moved away from the open upper end of the valve rod 67.

The shutter finger 602 is slidably mounted in an orifice 615 formed through the downstream body 61, with the interposition of two O-ring seals 616; a leakage conduit 617 connected to the leakage circuit 10 is formed in the downstream body 61 by opening into the orifice 615 between the two seals 616.

The safety system 601 comprises an adjustment screw 603 screwed into a thread provided in the orifice 615, above the shutter finger 602, the adjustment screw 603 being accessible from the outside to allow the shutter finger 602 to be selectively displaced by screwing/unscrewing the adjustment screw 603 which comes into abutment on the shutter finger 602.

The safety system 601 comprises a stop screw 604 which is also screwed into a thread provided in the orifice 615, above the adjustment screw 603. The stop screw 604 is hollow, to allow access with a suitable tool for the adjustment screw 603, and the stop screw 604 forms an upper stop abutment for the adjustment screw 603; a lower stop abutment for the adjustment screw 603 being formed by an inner shoulder 605 in the orifice 615.

The following description relates to the operation of the second pressure regulator 6.

FIG. 24 illustrates one configuration, which corresponds to a locked configuration inhibiting the regulation for the second pressure regulator 6, with the safety system 601 in closed mode. This configuration corresponds to a configuration when the device 1 is switched on (or when it starts up), and also to a configuration after the safety system 601 has been closed automatically following a drop in downstream pressure below the low threshold pressure.

In this configuration, the adjustment screw 603 is on its lower stop abutment, so that the shutter finger 602 is in the lowered position; and the piston 62 is raised in the direction of the lower face of the downstream body 61 under the action of the first biasing member 68, thus raising the valve rod 67 so that the open upper end of the valve rod 67 bears against the shutter finger 602 which then blocks the inner channel 670 at the upper end, thus closing the communication between the low pressure chamber 613 and the high pressure chamber 66.

In this configuration, if an upstream pressure (at the inlet of the second pressure regulator 6) is present, the safety system 601 will remain closed and the second pressure regulator 6 will remain closed, and only an automatic reset will allow the second pressure regulator 6 to be put back into operation.

FIG. 25 illustrates a configuration unlocked in the first reset phase, wherein the adjustment screw 603 is brought up to the abutment on the stop screw 604; the piston 62 is raised until it comes into abutment on the lower face of the downstream body 61 under the action of the first biasing member 68, thus exerting a thrust on the shutter finger 602 which is free to move up towards its raised position (without necessarily reaching completely its raised position); and the connection with the withdrawing device at the level of the withdrawing connector 25 is closed, so that a downstream pressure (pressure in the low pressure chamber 613) can be established.

FIG. 26 illustrates a configuration unlocked in the second reset phase, wherein an upstream pressure (at the inlet of the second pressure regulator 6 or pressure in the high pressure chamber 66) is applied (in particular after opening of the gate 40); under the effect of the upstream pressure, the shutter finger 602 is pushed towards its raised position so that the shutter finger 602 is no longer in abutment on the open upper end of the valve rod 67, and that the communication is reestablished between the low pressure chamber 613 and the high pressure chamber 66; the regulating flap 672 is in the downstream opening position and the expansion takes place at the expansion seat 652, the gas passing through the inner channel 670 of the valve rod 67 to reach the low pressure chamber 613; the pressure in the low pressure chamber 613 acts on the piston 62 in the direction of separation from the downstream body 61, so that the regulation is established in the second pressure regulator 6; and the discharging flap 671 is in the upstream closed position under the action of the second biasing member 69.

FIG. 27 illustrates an open regulating configuration, wherein the connection with the withdrawing device at the level of the withdrawing connector 25 is open; the adjustment screw 603 is lowered onto its lower stop abutment, so that the shutter finger 602 is brought into the lowered position; and under the effect of the downstream pressure (in the low pressure chamber 613), the piston 62 is sufficiently far from the downstream body 61 so that the shutter finger 602 does not come into abutment on the open upper end of the valve rod 67, indeed the clearance difference between the stroke of the adjustment screw 603 and the stroke of the piston 62 is provided so that the shutter finger 602 does not block the open upper end of the valve rod 67 in the open regulating configuration.

If the downstream pressure (pressure in the low pressure chamber 613) goes below a low threshold pressure (reflecting, as a reminder, an overflow at the outlet and therefore a downstream leak), the piston 62 rises (under the effect of the first biasing member 68) until the shutter finger 602 comes into abutment on the open upper end of the valve rod 67, and the second pressure regulator 6 returns to the configuration of FIG. 24.

If the downstream pressure (pressure in the low pressure chamber 613) exceeds a second predefined threshold pressure (which depends on the gas bearing surfaces and the spring coefficients of the biasing members 68, 69), then the operation is similar to that of the first pressure regulator 5, namely that the overpressure in the low pressure chamber 613 acts on the piston 62 in the direction of a separation from the downstream body 61 sufficient for the expansion flap 672 to be in the upstream closed position, under the effect of the second biasing member 69 which pushes the valve rod 67; and the valve rod 67 being in abutment on the expansion seat 652 and the piston 62 being sufficiently spaced from the downstream body 61, the discharging flap 671 takes off from the discharging seat 621 and thus passes into the downstream open position, allowing the communication between the low pressure chamber 613 and the discharging conduit 15 connected to the leakage circuit 10, and thus the discharge takes place in the leakage circuit 10 and the downstream pressure is released.

In the second pressure regulator 6, the discharging flap 671, the discharging seat 621 and the second biasing member 69 together form the discharging valve 60 mentioned previously with reference to FIG. 1.

Figure 8:
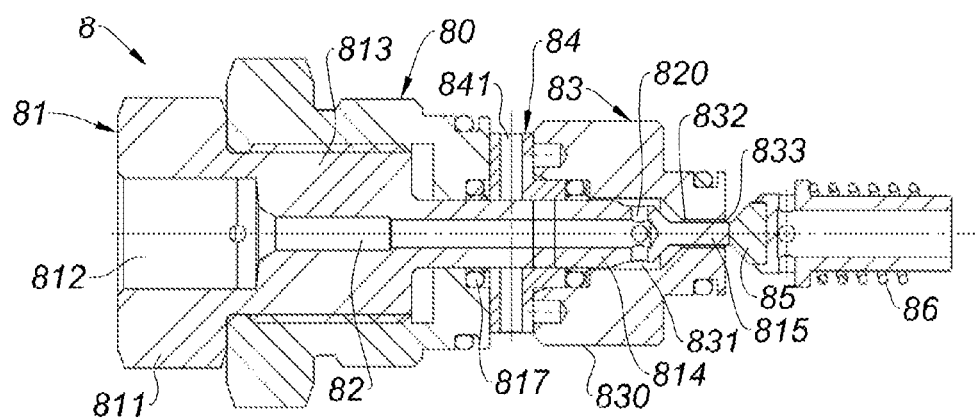
FIGS. 8 and 9 are schematic cross-sectional views of a filling connector of the device of FIGS. 2 to 7, in an open position (FIG. 8) and in a closed position (FIG. 9)

The filling connector 8 is described below with reference to FIGS. 8 and 9.

The filling connector 8 comprises a static hollow upstream body 80 forming a cover or plug accessible from the outside and provided with an outer thread 800 for fixing by screwing in the body 13, the hollow body 80 having an extended inner thread 801 through a central hole 802.

The filling connector 8 comprises a piston 81 screwed into the inner thread 801 of the upstream body 80 and internally having a filling duct 82.

The piston 81 has successively a gripping portion 811 allowing manual grasping or with suitable tools, in order to screw/unscrew the piston 81, and in which is provided a female socket 812, in communication with the filling duct 82, provided for a connection with a male socket of the gas source SO; a threaded portion 813 screwed into the inner thread 801 of the upstream body 80; a smooth portion 814; and an end portion 815 forming a thrust finger.

The filling duct 82 opens at the end of the smooth portion 814, before the end portion 815, via peripheral holes 820.

The smooth portion 814 also has at least one drain orifice 816 opening transversely into the filling duct 82, at a distance from the peripheral holes 820.

The filling connector 8 comprises a static downstream body 83 provided with an outer thread 830 for a fixing by screwing in the body 13, and more specifically for fixing to the bottom of the corresponding bore, until the downstream body 83 or in abutment on an inner shoulder of the bore.

The downstream body 83 has an inner channel having successively an enlarged upstream part 831 inside which the filling duct 82 opens via the peripheral holes 820; and a narrowed downstream part 832 crossed by the end portion 815. The downstream part 832 having a downstream end forming a seat 833.

The filling connector 8 comprises a drain body 84 interposed between the upstream body 80 and the downstream body 83 and having at least one drain duct 841 connected to the leakage circuit 10 or to the safety circuit 9 via a drain channel or duct 16 formed in the body 13 and visible in FIG. 13. The drain duct 841 opens out at the periphery of the smooth portion 814 of the piston 81, between two seals 817 mounted around the smooth portion 814 in the upstream body 80 and the downstream body 83 respectively.

The filling connector 8 further comprises an isolation flap 85 movable relative to the seat 833, inside the bore of the body 13, between an upstream position for closing the filling duct 82 (visible in FIG. 9) wherein the isolation flap 85 bears on the seat 833, thus cutting off the communication between the filling duct 82 and the upstream end 72 of the filling circuit 7; and a downstream position for opening the filling duct 82 (visible in FIG. 8) wherein the isolation flap 85 is detached from the seat 833, thus establishing communication between the filling duct 82 and the upstream end 72 of the filling circuit 7.

The filling connector 8 also comprises a biasing member 86, in particular of the helical spring type, which biases the isolation flap 85 towards the upstream closed position.

Figure 9:
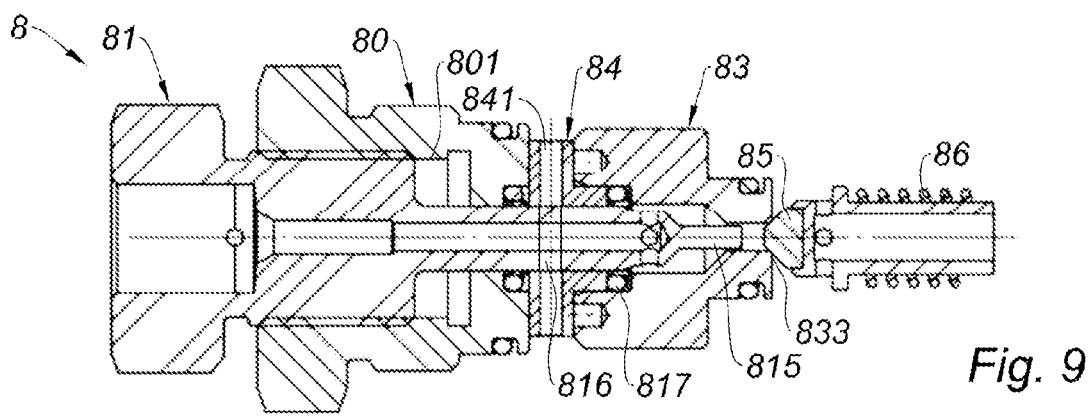

The piston 81 is displaceable by screwing/unscrewing selectively between an open position (illustrated in FIG. 8) and a closed position (illustrated in FIG. 9).

In general, the piston 81 is displaceable by any mechanical action ensuring a translational movement of the piston between its open position and its closed position, wherein the piston 81 remains sealed in the upstream body 80. As an alternative example, the piston 81 may be displaceable with a quarter-turn mechanism or other equivalent mechanism.

In the open position, the piston 81 is screwed downstream so that the end portion 815 exerts a thrust on the isolation flap 85, against the biasing member 86, towards its open position; and the drain orifice 816 provided on the piston 81 does not coincide with the drain duct 841 provided on the drain body 84.

In the closed position, the piston 81 is unscrewed upstream so that the end portion 815 is moved away from the isolation flap 85 which is biased by the biasing member 86 towards its closed position; and the drain orifice 816 provided on the piston 81 coincides with the drain duct 841 provided on the drain body 84 to establish communication between the filling duct 82 and the leakage circuit 10 or the safety circuit 9.

Thus, in operation, the piston 81 is in its closed position and the source of gas SO is connected to the socket 812, then the piston 81 is screwed towards its open position and the source of gas SO is open to fill the storage container RE.

At the end of the filling, the source of gas SO is closed, the piston 81 is unscrewed towards its closed position so that an automatic depressurization of the filling duct 82 takes place through the drain orifice 816 towards the leakage circuit 10 or the safety circuit 9, and finally the source of gas SO is disconnected from the female socket 812.

Referring to FIGS. 29 and 30, the high pressure safety valve 93 has an inlet 930 connected to the upstream end 21 of the withdrawing circuit 2, in other words connected to the outlet of the filling connector 8 and to the main conduit 31 of the storage connector 3; and an outlet 931 connected to the upstream end 92 of the safety circuit 9 (or collection point on the outside).

The high pressure safety valve 93 comprises a flap 932 bearing on a seat 933 open on the inlet, under the effect of a biasing member 934.

If the pressure at the inlet 930 exceeds a threshold value greater than the maximum pressure provided in the storage container RE (threshold value for example in the range of 730 to 780 bars), the flap 932 is opened under the effect of the high pressure and places the inlet 930 and the outlet 931 in communication. The high pressure safety valve 93 thus has the function of evacuating the gas to the outside in the event of excessive pressure in the device 1.

Referring to FIGS. 31 and 32, the high temperature safety valve 94 has an inlet 940 connected to the upstream end 21 of the withdrawing circuit 2, in other words connected to the outlet of the filling connector 8 and to the main conduit 31 of the storage connector 3; and an outlet 941 connected to the upstream end 92 of the safety circuit 9 (or collection point on the outside), the outlet 931 being provided with a constriction forming a calibrated orifice for limiting the flow.

The high temperature safety valve 94 includes a piston 942 provided with a rod 943 which cuts off the communication between the inlet 940 and the outlet 941, and a base 944 bearing on a thermally fusible pellet 945, itself bearing on a sintered metal screen 947.

A biasing member 946 bears on the base 944 to bias the piston 942 against the thermally fusible pellet 945.

As visible in FIG. 32, if the temperature is below a threshold value (for example in the range of 90 and 120° C.), the thermally fusible pellet 945 is not melted and the rod 943 cuts off communication between the inlet 940 and outlet 941, so that the high temperature safety valve 94 is closed.

As visible in FIG. 31, if the temperature is higher than the threshold value, the thermally fusible pellet 945 is melted and the rod 943 is biased by the biasing member 946 and/or by the input pressure, in the direction of an opening of the communication between the inlet 940 and the outlet 941, so that the high temperature safety valve 94 is open.

Figure 19:
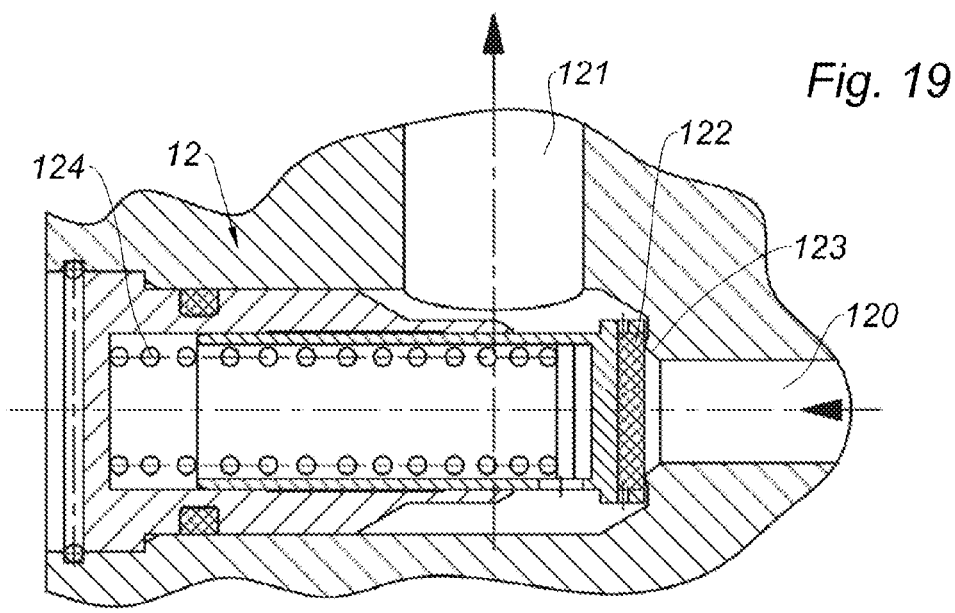
FIG. 19 is a schematic cross-sectional view of a low pressure safety valve of the device of FIGS. 2 to 7, illustrated in a test body (and not in the body of the device) for clarity.

Referring to FIG. 19, the low pressure safety valve 12 has an inlet 120 connected to the downstream end 22 of the withdrawing circuit 2; and an exhaust outlet 121 connected to the leakage circuit 10 upstream of the check valve 11.

The low pressure safety valve 12 comprises a flap 122 bearing on a seat 123 open on the inlet 120, under the effect of a biasing member 124. If the pressure at the inlet 120 exceeds a threshold value greater than the maximum pressure provided in the withdrawing device (threshold value for example in the range of 2 to 5 bars), the flap 122 opens under the effect of the pressure and connects the inlet 120 and the outlet 121. The low pressure safety valve 12 thus has the function of evacuating the gas to the outside in the event of excessive pressure in the withdrawing device.

It should be noted that the device 1 can do without the low pressure safety valve 12 if it is redundant with a safety valve integrated into the withdrawing device. Of course, if the withdrawing device has its own safety valve, the low pressure safety valve 12 can still be present in the device 1.

The device 1 described above thus has many advantages in terms of quality and precision of the expansion, thanks to two pressure regulators 5, 6 in series which allow an expansion on two stages; safety in the event of malfunctions or incidents, thanks in particular to the discharging valves 50, 60 integrated in the pressure regulators 5, 6, the safety system 601 and other safety systems whose high pressure safety valve 93 and the high temperature safety valve 94; safety during filling operations thanks to the filling connector 8 which integrates an automatic depressurization (or drain) function during disconnection between the filling connector and the source of pressurized gas; safety against leaks thanks to a leakage circuit 10 which collects the leakage, discharge and drain ducts 14, 15, 16, 17, 18, 32, which are systematically surrounded by two seals forming particularly effective double sealing barriers to provide that there is no leakage in the device 1 to the outside, upstream and downstream; and compactness and lightness with a body 13 improved to accommodate the numerous components in suitable bores and the numerous channels and conduits of the various circuits 2, 7, 9 and 10.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. The modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for filling and withdrawing gas, the device comprising:
    a withdrawing circuit comprising an upstream end provided with a storage connector configured for a connection with a storage container of a pressurized gas, and a downstream end provided with a withdrawing connector configured for a connection with a withdrawing device for withdrawing gas at reduced pressure, wherein said withdrawing circuit comprises at least one driven isolation gate and at least one pressure regulator; and
    a filling circuit comprising an upstream end provided with a filling connector configured for a connection with a source of pressurized gas for filling the storage container, and a downstream end connected to the upstream end of the withdrawing circuit;
    wherein the filling connector comprises a piston internally defining a filling duct and having at least one drain orifice opening transversely into said filling duct, wherein said piston is movable at least inside a drain body provided with a drain duct connected to a leakage circuit connected to an outside, said drain duct opening out at a periphery of the piston between two seals mounted around the piston, said piston being selectively displaceable between:
        an open position establishing communication between said filling duct and the upstream end of the filling circuit, and wherein the drain orifice does not coincide with the drain duct; and
        a closed position cutting off the communication between said filling duct and the upstream end of the filling circuit, and wherein the drain orifice coincides with the drain duct to establish communication between said filling duct and the leakage circuit.

2. The device according to claim 1, wherein the filling connector comprises an isolation flap movable relative to a seat between an upstream position for closing the filling duct and a downstream position for opening the filling duct, wherein the piston is selectively displaceable between:
    its open position wherein said piston acts on said isolation flap towards its downstream position; and
    its closed position wherein said piston does not act on said isolation flap which is biased towards its upstream position by a biasing member.

3. The device according to claim 1, wherein the piston is displaceable by screwing/unscrewing.

4. The device according to claim 1, wherein the storage connector comprises a main conduit connected to the upstream end of the withdrawing circuit and a leakage conduit connected to the leakage circuit and opening between two concentric seals.

5. The device according to claim 1, wherein the at least one pressure regulator comprises:
    a high pressure chamber at an inlet;
    a low pressure chamber at an outlet;
    a movable regulation part on which the gas from the low pressure chamber bears on one side and a biasing member on the other side; and
    a regulating flap cooperating with the regulation part and movable relative to an expansion seat between an upstream position for closing the communication between the low pressure chamber and the high pressure chamber and a downstream position for opening the communication between the low pressure chamber and the high pressure chamber, wherein, when the gas pressure in the low pressure chamber exceeds a predefined threshold, the regulating flap is in the upstream position and the low pressure chamber is brought into communication with a discharge conduit connected to the leakage circuit.

6. The device according to claim 5, wherein the withdrawing circuit comprises two pressure regulators in series, wherein each pressure regulator has a discharge conduit connected to the leakage circuit and placed in communication with the low pressure chamber when the gas pressure in said low pressure chamber exceeds a predefined threshold specific to each pressure regulator.

7. The device according to claim 1, wherein the leakage circuit comprises a check valve.

8. The device according to claim 1, wherein the leakage circuit comprises a low pressure safety valve having an inlet connected to the downstream end of the withdrawing circuit, and an exhaust outlet connected to the leakage circuit.

9. The device according to claim 1, further comprising a safety circuit having an upstream end connected to the upstream end of the withdrawing circuit and a downstream end connected to the outside, said safety circuit comprising at least one safety valve selected from a high pressure safety valve and/or a high temperature safety valve.

10. The device according to claim 9, wherein the safety circuit comprises a drain tap with a flow limiter, placed in parallel with the at least one safety valve.

11. A method of using the device according to claim 1, the method comprising:
    connecting the storage connector to a storage container of pressurized hydrogen gas; and
    connecting the withdrawing connector to a withdrawing device of a fuel cell type.

* * * * *